(12) United States Patent
Kikuchi

(10) Patent No.: US 9,156,452 B2
(45) Date of Patent: Oct. 13, 2015

(54) VEHICLE CONTROL DEVICE, AND VEHICLE CONTROL METHOD

(71) Applicant: Nissan Motor Co., Ltd., Yokohama-shi, Kanagawa (JP)

(72) Inventor: Hironobu Kikuchi, Isehara (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 14/386,829

(22) PCT Filed: Apr. 8, 2013

(86) PCT No.: PCT/JP2013/060585
§ 371 (c)(1),
(2) Date: Sep. 22, 2014

(87) PCT Pub. No.: WO2013/172122
PCT Pub. Date: Nov. 21, 2013

(65) Prior Publication Data
US 2015/0039199 A1  Feb. 5, 2015

(30) Foreign Application Priority Data

May 14, 2012 (JP) ................. 2012-110703

(51) Int. Cl.
*B60T 8/1755* (2006.01)
*B60G 17/016* (2006.01)

(52) U.S. Cl.
CPC ........... *B60T 8/1755* (2013.01); *B60G 17/0164* (2013.01); *B60T 8/17555* (2013.01); *B60G 2800/014* (2013.01); *B60T 2230/04* (2013.01); *B60T 2260/06* (2013.01)

(58) Field of Classification Search
CPC ............. B60T 8/1755; B60T 8/17555; B60G 17/0164
See application file for complete search history.

(56) References Cited

U.S. PATENT DOCUMENTS

| | | | |
|---|---|---|---|
| 5,444,621 A | 8/1995 | Matsunaga et al. | |
| 2005/0077692 A1 | 4/2005 | Ogawa | |
| 2009/0085309 A1* | 4/2009 | Hirao et al. | 280/5.503 |
| 2010/0094495 A1* | 4/2010 | Fujimoto et al. | 701/22 |
| 2010/0241305 A1* | 9/2010 | Itabashi et al. | 701/34 |
| 2011/0137514 A1* | 6/2011 | Itabashi | 701/29 |
| 2011/0213527 A1* | 9/2011 | Itabashi et al. | 701/37 |

FOREIGN PATENT DOCUMENTS

| | | |
|---|---|---|
| CN | 1600588 A | 3/2005 |
| CN | 101024371 A | 8/2007 |
| DE | 4219012 A1 | 12/1992 |
| JP | 11-20443 A | 1/1999 |
| JP | 11-129724 A | 5/1999 |
| JP | 2000-272317 A | 10/2000 |
| JP | 2009-101918 A | 5/2009 |
| JP | 2009-241813 A | 10/2009 |

\* cited by examiner

*Primary Examiner* — Mussa A Shaawat
*Assistant Examiner* — Kelly D Williams
(74) *Attorney, Agent, or Firm* — Global IP Counselors, LLP

(57) ABSTRACT

A vehicle control device includes a sensor and a controller. The sensor detects wheel speed. The controller estimates an amount of pitch motion made by a vehicle based on information in a prescribed frequency range of wheel speed detected by the sensor. The controller control friction brakes so as to bring the pitch motion amount to a target pitch motion amount, as well as gradually lowering an amount by which the friction brakes are controlled, in instances where an estimation accuracy of the pitch motion amount deteriorates.

5 Claims, 18 Drawing Sheets

VEHICLE CONTROL DEVICE, AND VEHICLE CONTROL METHOD

CROSS-REFERENCE TO RELATED APPLICATIONS

This application is a U.S. National stage application of International Application No. PCT/JP2013/060585, filed Apr. 8, 2013, which claims priority to Japanese Patent Application No. 2012-110703 filed in Japan on May 14, 2012.

BACKGROUND

1. Field of the Invention

The present invention relates to a control device and a control method for controlling the state of a vehicle.

2. Background Information

Japanese Laid-Open Patent Application No. 2009-241813 discloses a technology for estimating stroke speed from fluctuations in wheel speed in a predetermined frequency region, and modifying the damping force of a variable damping force shock absorber in accordance with the stroke speed, to control the sprung behavior.

SUMMARY

However, a problem encountered in the aforementioned prior art is that when a disturbance of wheel speed arises within the predetermined frequency region, the accuracy of estimation of the stroke speed deteriorates. With the foregoing in view, it is an object of the present invention to provide a control device and a method for controlling a vehicle, whereby it is possible to control the vehicle body orientation, even when the accuracy of estimation of the sprung mass state has deteriorated.

To achieve the aforementioned object, the vehicle control device of the present invention estimates a pitch motion amount based on information in a predetermined frequency region of wheel speed detected by sensors that detect the wheel speed, and controls friction brakes in such as way as to bring this estimated pitch motion amount to a target pitch motion amount, as well as gradually lowering the amount by which the friction brakes are controlled, in the event of deterioration in accuracy of estimation of the pitch motion amount.

Therefore, deterioration of estimation accuracy of the sprung mass state can be detected. Additionally, instances of erroneous control can be minimized that arises from limited functionality when the estimation accuracy of the sprung mass state has deteriorated, and thus, stabilized vehicle orientation can be achieved. Further, by gradually lowering the braking torque control amount observed immediately prior to the time that deterioration of estimation accuracy was detected, discomfort to the driver can be reduced.

DETAILED DESCRIPTION OF THE EMBODIMENTS

First Embodiment

Figure 1:
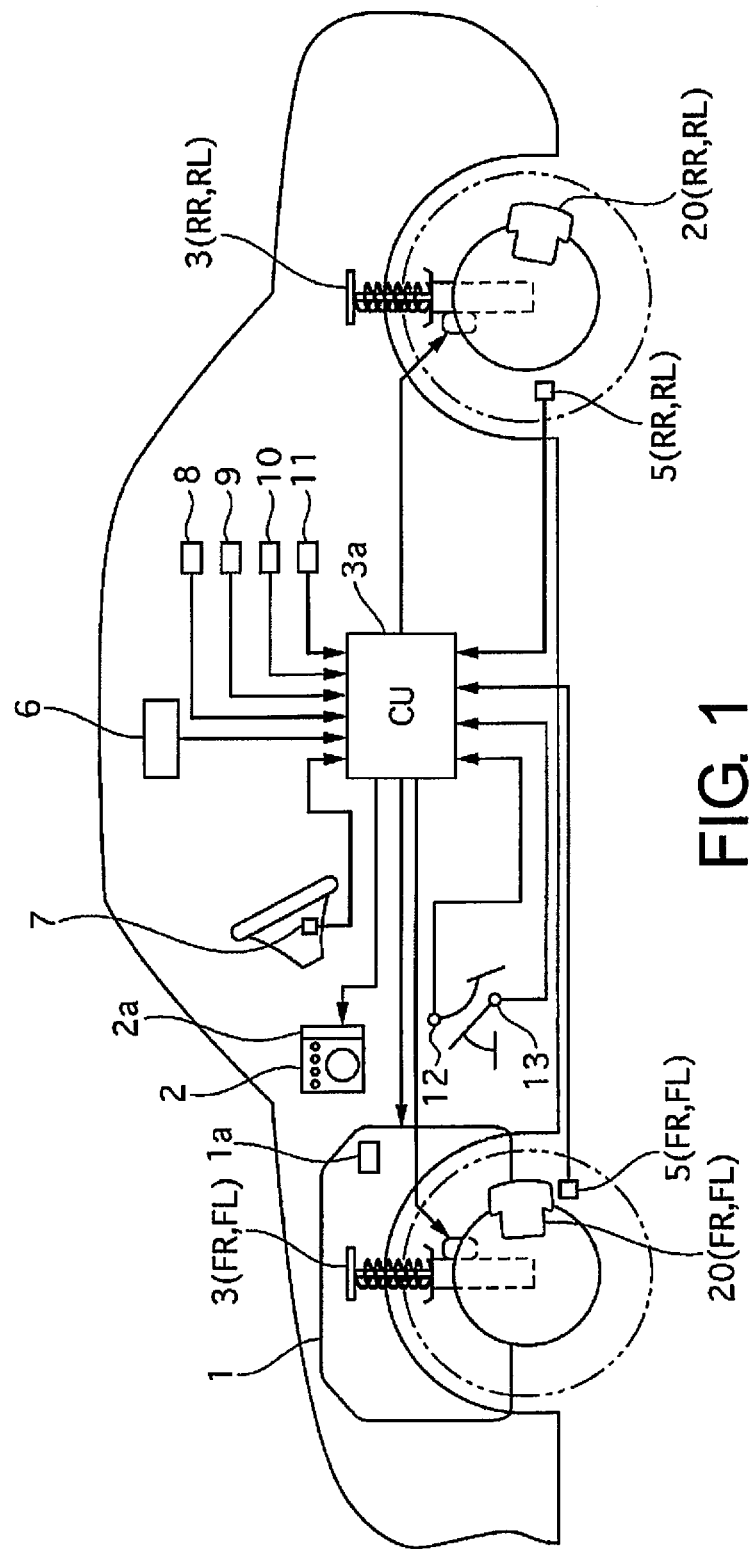
FIG. 1 is a schematic system diagram showing a vehicle control device according to a first embodiment.

FIG. 1 is a schematic system diagram showing a vehicle control device according to a first embodiment. A vehicle comprises an engine 1 constituting a power source, brakes 20 for generating braking torque by applying frictional force to the wheels (brakes corresponding to individual wheels will be referred to hereafter as follows: front right brake: 20FR; front left brake: 20FL; rear right brake: 20RR; rear left brake: 20RL), and shock absorbers 3 capable of variable damping force control, provided between each of the wheels and the vehicle body ("shock absorber" will be abbreviated "S/A" in the following description, and S/A corresponding to individual wheels will be referred to as follows: front right S/A: 3FR; front left S/A: 3FL; rear right S/A: 3RR; rear left S/A: 3RL).

The engine 1 has an engine controller (also referred to hereinafter as an engine control unit, and corresponding to the power source control means) 1a. The engine controller 1a controls the engine operation state (engine rpm, engine output torque, etc.) as desired by controlling the opening of the throttle valve, the fuel injection level, the ignition timing, and the like, of the engine 1. The brakes 20 generate braking torque based on hydraulic pressure supplied from a brake control unit 2 capable of controlling brake hydraulic pressure for each of the wheels, according to the driving state. The brake control unit 2 has a brake controller 2a (also referred to hereinafter as a brake control unit) for controlling the braking torque generated by the brakes 20, the desired hydraulic pressure being generated in the brakes 20 for each of the wheels through opening and closing of a plurality of solenoid valves using master cylinder pressure generated by a driver operating the brake pedal, or pump pressure generated by a built-in motor-driven pump, as a hydraulic pressure source.

The S/A 3 are damping force-generating devices for damping the elastic motion of coil springs provided between the unsprung mass (the axles, wheels, etc.) and the sprung mass (vehicle body, etc.) of the vehicle, the damping force being designed to be variable through the operation of actuators. Each S/A 3 has a cylinder in which fluid is sealed, a piston that makes strokes within the cylinder, and an orifice for controlling the movement of the fluid between fluid chambers formed above and below the piston. Orifices having different orifice diameters are formed in the piston, and an orifice corresponding to a control command is selected from among the various orifices when the S/A actuator operates. Damping force corresponding to the diameter of the orifice is thereby generated. The movement of the piston will be more easily restricted if the orifice diameter is small, whereby the damping force will be higher, and movement of the piston will be less easily restricted if the orifice diameter is large, decreasing the damping force.

Apart from selecting the diameter of the orifice, damping force may also be set, for example, by disposing a solenoid control valve on a communicating passage connecting the fluid, formed above and below the piston, and controlling the amount of opening and closing of the solenoid control valve; the invention is not particularly limited with respect thereto. Each S/A 3 has an S/A controller 3a (corresponding to a damping force control means) for controlling the damping force of the S/A 3, the damping force being controlled through operation of the orifice diameter by the S/A actuator.

Also provided are wheel speed sensors 5 for detecting the wheel speed of each of the wheels (hereinbelow, when indicating wheel speeds corresponding to individual wheels, these will be referred to as: front right wheel speed: 5FR; front left wheel speed 5FL; rear right wheel speed: 5RR; rear left wheel speed: 5RL); an integrated sensor 6 for detecting forward/reverse acceleration, yaw rate, and lateral acceleration acting upon the center of gravity of the vehicle; a steering angle sensor 7 for detecting a steering angle indicating the amount to which the driver has operated the steering wheel; a vehicle speed sensor 8 for detecting vehicle speed, an engine torque sensor 9 for detecting engine torque; an engine rpm sensor 10 for detecting engine rpm; a master pressure sensor 11 for detecting master cylinder pressure; a brake switch 12 for outputting an on state signal when a brake pedal is operated; an accelerator opening sensor 13 for detecting the opening degree of the accelerator pedal; and a temperature sensor 14 for detecting outside air temperature. Signals from these various sensors are inputted to the engine controller 1, the brake controller 2a, and the S/A controller 3a, as needed. The integrated sensor 6 may be disposed at the location of the center of gravity of the vehicle, or at some other location, with no particular limitation, provided that the configuration is on by which estimation of various values at the position of the center of gravity is possible. The sensor need not be of integrated type; individual sensors for detecting yaw rate, forward/reverse acceleration, and lateral acceleration may also be provided.

(Overall Configuration of Vehicle Control Device)

In the vehicle control device according to the first embodiment, three actuators are used in order to control the vibrational state arising in the sprung mass. Because control respectively performed thereby serves to control the state of the sprung mass at this time, interference is a problem. In addition, the elements controllable by the engine 1, the elements controllable by the brakes 20, and the elements controllable by the S/A 3 respectively differ, and the issue which combinations these elements should be controlled in is another problem. For example, the brakes 20 are capable of controlling bouncing motion and pitching motion, but controlling both will create a strong sense of deceleration and tend to create discomfort for the driver. The S/A 3 are capable of controlling all rolling motion, bouncing motion, and pitching motion, but in cases in which all over wide ranges is performed by the S/A 3, the S/A 3 manufacturing costs may be greater, and the damping force will tend to be higher, creating a tendency for high-frequency vibration to be input from the road surface, and tending to produce discomfort for the driver. In other words, there is a trade-off in that control performed by the brakes 20 will not lead to a worsening of high-frequency vibration, but will lead to an increased sense of deceleration, whereas control performed by the S/A 3 will not create a sense of deceleration, but may lead to input of high-frequency vibration.

Thus, in the vehicle control device of the first embodiment, a comprehensive assessment is made of these problems, and in order to achieve a control configuration utilizing the respective advantages of the respective control characteristics while compensating for the weaknesses of each other, to thereby achieve a vehicle control device that, while inexpensive, offers superior vibration damping performance, the control system as a whole was built in consideration primarily of the following exemplary points.

(1) The amount of control by the S/A 3 is minimized, through parallel control of the engine 1 and the brakes 20.

(2) The motion subjected to control by the brakes 20 is limited to pitching motion, thereby eliminating the sense of deceleration produced by control by the brakes 20.

(3) The amount of control performed by the engine 1 and the brakes 20 is limited to less than the actually outputtable control amount, thereby reducing the load on the S/A 3, while minimizing the unnatural feel associated with control performed by the engine 1 and the brakes 20.

(4) Skyhook control is performed by all of the actuators. This allows skyhook control to be accomplished through an inexpensive configuration utilizing all of the wheel speed sensors installed in the vehicle, without the use of a stroke sensor, a sprung mass vertical acceleration sensor, or the like, as is usually necessary for skyhook control.

(5) Scalar control (frequency-sensitive control) has been newly introduced in order to address input of high-frequency vibration, which is difficult to address using skyhook control or other types of vector control, during sprung mass control by the S/A 3.

(6) The control state to be accomplished by the S/A is selected, as appropriate, according to the driving state, thereby providing a control state suited to the driving conditions.

The foregoing summarizes the features of the control system in its entirety as constituted according to the embodiment. The specifics by which these individual features will be described in sequence hereafter.

Figure 2:
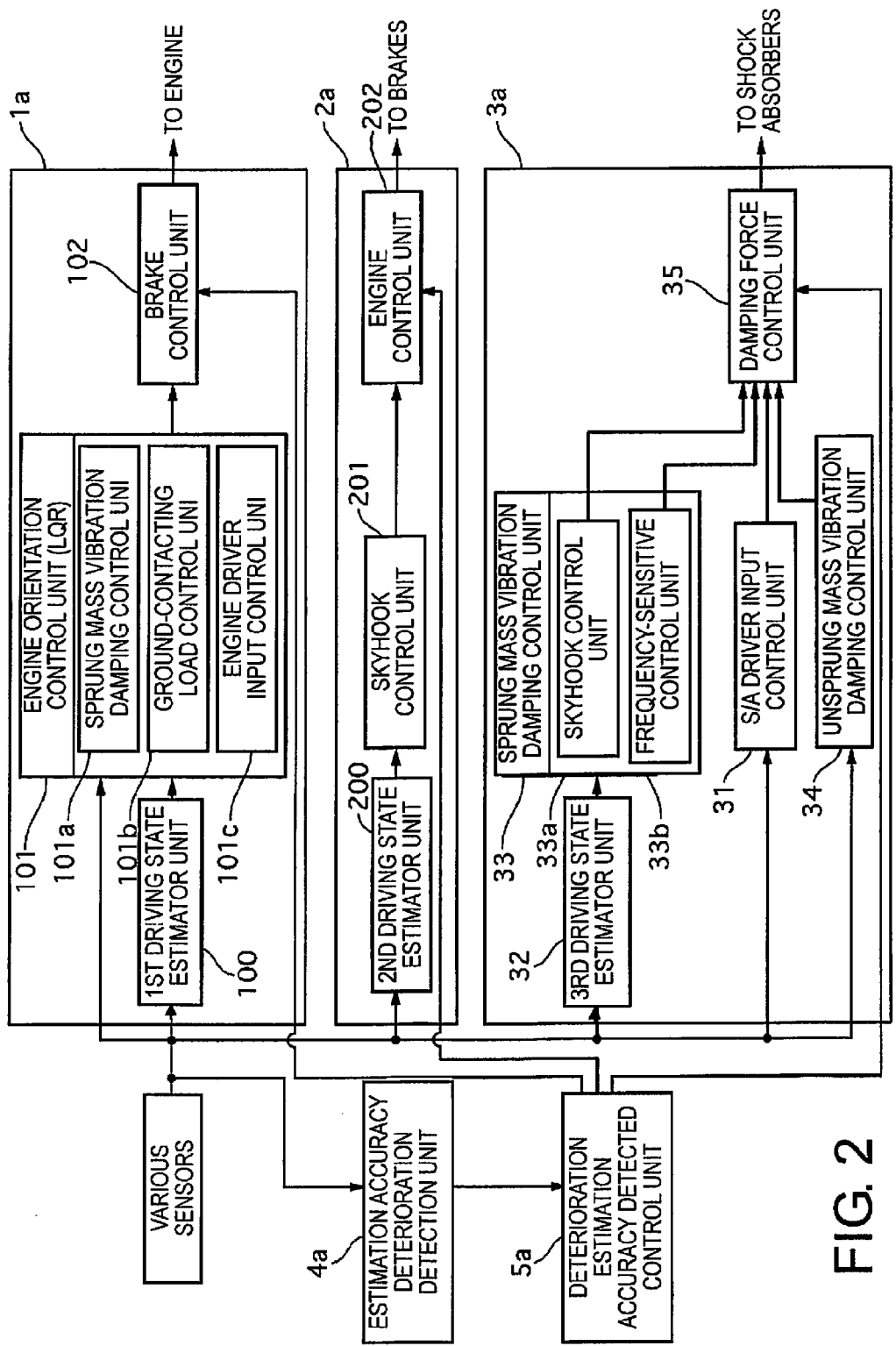
FIG. 2 is a control block diagram showing a configuration of control performed by the vehicle control device according to the first embodiment.

FIG. 2 is a control block diagram showing a configuration of control by the vehicle control device according to the first embodiment. In the first embodiment, the control devices are constituted by three units: an engine controller 1*a*, a brake controller 2*a*, and an S/A controller 3*a*, with a wheel speed feedback control system being configured in the respective control devices. Separately from the respective control devices, the system has an estimation accuracy deterioration detection unit 4*a* for detecting deterioration in the estimation accuracy, which indicates the reliability of the state estimations made by the driving state estimating units, discussed later (a first driving state estimating unit 100, a second driving state estimating unit 200, and a third driving state estimating unit 32); and a deterioration estimation accuracy detected control unit 5*a*, for transitioning to a suitable control state when deterioration in the estimation accuracy has been detected. The estimation accuracy deterioration detection unit 4*a* and the deterioration estimation accuracy detected control unit 5*a* will be described in detail below. Here, in the first embodiment, a configuration provided with three control devices as the control devices is shown; however, a configuration in which all of the control devices are constituted by an integrated control device would be acceptable as well, with no particular limitations. The configuration provided with three control devices in the first embodiment envisions repurposing the engine controller and the brake controller of an existing vehicle as the engine control unit 1*a* and the brake control unit 2*a*, while installing the separate S/A controller 3*a*, to realize the vehicle control device according to the first embodiment.

(Configuration of Engine Controller)

The engine controller 1*a* has the first driving state estimating unit 100 for estimating, based on wheel speed detected primarily by wheel speed sensors, the stroke speed, bounce rate, roll rate, and pitch rate of each wheel, for use in skyhook control by a sprung mass vibration damping control unit 101*a*, discussed below; an engine orientation control unit 101 for calculating an engine orientation control amount constituting an engine torque command; and an engine control unit 102 for controlling the operation state of the engine 1, based on the calculated engine orientation control amount. The specifics of the estimation process by the first driving state estimating unit 100 will be discussed below. The engine orientation control unit 101 has the sprung mass vibration damping control unit 101*a* which calculates a sprung mass control amount for minimizing bouncing motion and pitching motion caused by skyhook control; a ground-contacting load control unit 101*b* that calculates a ground-contacting load fluctuation-minimizing control amount for minimizing ground-contacting load fluctuation of the front wheels and the rear wheels; and an engine-side driver input control unit 101*c* for calculating, based on signals from the steering angle sensor 7 and the vehicle speed sensor 8, a yaw response control amount corresponding to the vehicle behavior that the driver wishes to achieve. The engine orientation control unit 101 calculates an engine orientation control amount at which the control amounts calculated by the control units reach minimum, doing so through optimal control (LQR), and outputs a final engine orientation control amount to the engine control unit 102. By minimizing bouncing motion and pitch motion by the engine 1 in this manner, the amount of damping force control in the S/A 3 can be reduced, and exacerbation of high-frequency vibration can be avoided. Because the S/A 3 can focus on minimizing rolling motion, rolling motion can be effectively minimized.

(Configuration of Brake Controller)

The brake controller 2*a* has the second driving state estimating unit 200, which based on wheel speed detected by the wheel speed sensors 5, estimates a stroke speed, a pitch rate, and so on for each wheel; a skyhook control unit 201 which, based on skyhook control based on the estimated stroke speed and pitch rate, calculates a brake orientation control amount (discussed in detail later); and a brake control unit 202 that controls braking torque of the brakes 20, based on the calculated brake orientation control amount. In the first embodiment, identical processes are employed as the estimation processes in the first driving state estimating unit 100 and the second driving state estimating unit 200; however, other estimation processes could be employed, provided that the processes involve estimation from wheel speed. By having pitching motion be controlled by the brakes 20 in this manner, the amount of damping force control in the S/A 3 can be reduced, and exacerbation of high-frequency vibration can be avoided. Because the S/A 3 can focus on minimizing rolling motion, rolling motion can be effectively minimized.

(Configuration of S/A Control Device)

The S/A controller 3*a* has a driver input control unit 31 that performs driver input control to reach a desired vehicle orientation based on an operation by the driver (a steering operation, accelerator operation, brake pedal operation, or the like); a third driving state estimating unit 32 that estimates a driving state based on values detected by various sensors (primarily the wheel speed sensor values of the wheel speed sensors 5); a sprung mass vibration damping control unit 33 that controls the vibration state of the sprung mass based on the estimated driving state; an unsprung mass vibration damping control unit 34 that controls the vibration state of the unsprung mass based on the estimated driving state; and a damping force control unit 35 that, based on a shock absorber orientation control amount output by the driver input control unit 31, a sprung mass vibration damping amount output by the sprung mass vibration damping control unit 33, and an unsprung mass vibration damping amount output by the unsprung mass vibration damping control unit 34, determines damping force to be set for the S/A 3, and performs damping force control of the S/A. In the first embodiment, identical estimation processes are employed as the estimation processes in the first driving state estimating unit 100, the second driving state estimating unit 200, and the third driving state estimating unit 32; however, other estimation processes could be employed, with no particular limitations, provided that the processes involve estimation from wheel speed.

Figure 3:
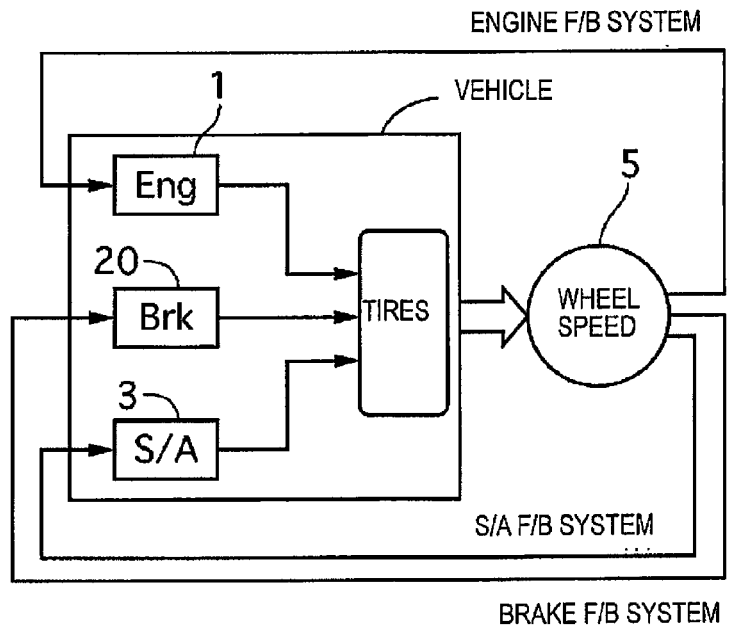
FIG. 3 is a conceptual diagram showing a configuration of a wheel speed feedback control system according to the first embodiment.

In the first embodiment, the feedback control mechanisms are constituted to employ the wheel speed sensors 5 of all of the actuators. FIG. 3 is a conceptual diagram showing a configuration of a wheel speed feedback control system according to the first embodiment. The engine 1, the brakes 20, and the S/A 3 respectively constitute a separate engine feedback control system, brake feedback control system, and SA feedback control system. When the respective actuators are operated separately with no monitoring of their reciprocal operation states, control interference becomes a problem. However, because the effects produced by control of each actuator are manifested as fluctuations of respective wheel speeds, by constituting a wheel speed feedback control system, the effects of the actuators are reciprocally monitored as a result, avoiding control interference. For example, when certain sprung mass vibration is minimized by the engine 1, fluctuations in wheel speed arise in association therewith. Even where the other actuators are not aware of the specifics of control performed by the engine 1, control by the brakes 20 and the S/A 3 is performed based on wheel speed, which reflects these effects. Specifically, because the feedback control mechanism is constituted using the shared values of wheel speed, even during separate control without the application of reciprocal monitoring for control purposes, control is ultimately performed based on reciprocal monitoring (hereinafter, such control is termed cooperative control), and the vehicle orientation can be made to converge in a stabilized direction. The feedback control systems will be described in succession below.

(Driving State Estimating Unit)

First, the first, second, and third driving state estimating units which are provided to the feedback control systems and share a common configuration, will be described. In the first embodiment, identical estimation processes are employed as the estimation processes in the first driving state estimating unit 100, the second driving state estimating unit 200, and the third driving state estimating unit 32. Therefore, because the processes in the estimating units are common to each, the estimation process taking place in the third driving state estimating unit 32 will be described as representative. Provided that wheel speed is employed in state estimation, each of these driving state estimating units may be provided with a separate estimation model, with no particular limitations.

Figure 4:
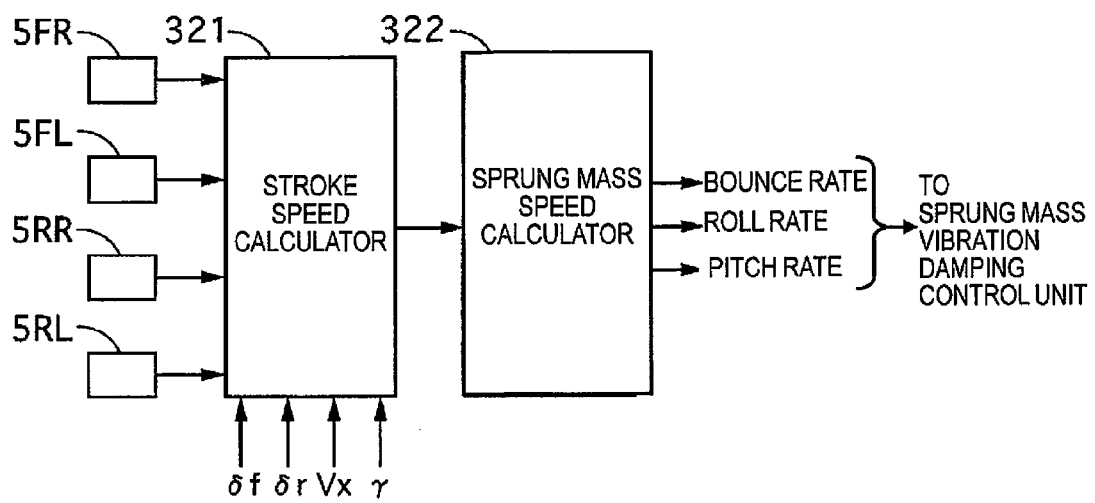
FIG. 4 is a control block diagram showing the configuration of a driving state estimating unit of the first embodiment.

FIG. 4 is a control block diagram showing the configuration of the third driving state estimating unit of the first embodiment. The third driving state estimating unit 32 of the first embodiment calculates a stroke speed, bounce rate, roll rate, and pitch rate for each wheel used in skyhook control performed by the sprung mass vibration damping control unit 33 as described below, doing so fundamentally based on the wheel speeds detected by the wheel speed sensors 5. First, the values from the wheel speed sensor 5 of each of the wheels are inputted into a stroke speed calculator unit 321, and sprung mass speed is calculated by the stroke speed calculator unit 321 from the stroke speeds calculated for the wheels.

Figure 5:
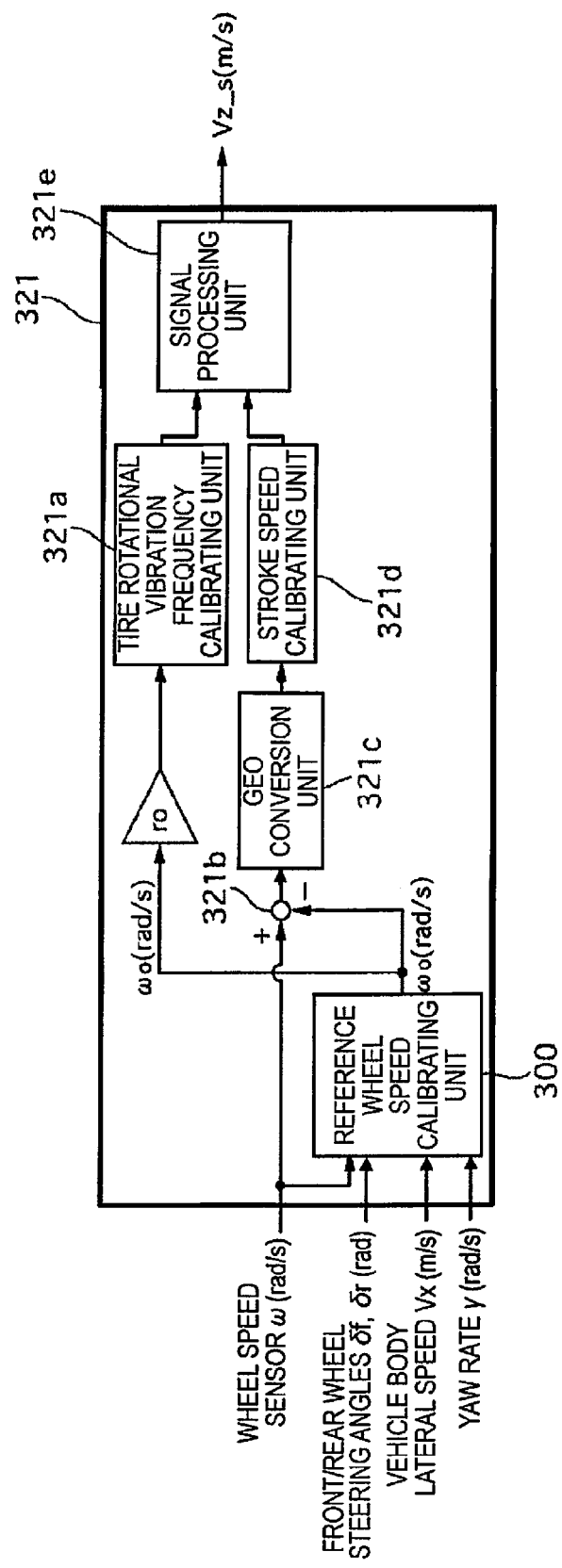
FIG. 5 is a control block diagram showing the specifics of control in a stroke speed calculator unit of the first embodiment.

FIG. 5 is a control block diagram showing the specifics of control in a stroke speed calculator unit of the first embodiment. A stroke speed calculator unit 321 is separately provided for each wheel; the control block diagram shown in FIG. 5 is a control block diagram focusing on a specific wheel. The stroke speed calculator unit 321 has a reference wheel speed calculating unit 300 for calculating a reference wheel speed based on the values from the wheel speed sensors 5, a front wheel steering angle of detected by the steering angle sensor 7, a rear wheel steering angle or (the actual rear wheel steering angle when a rear wheel steering device is provided; otherwise zero), a vehicle body lateral speed, and an actual yaw rate detected by the integrated sensor 6; a tire rotational vibration frequency calculating unit 321a for calculating tire rotational vibration frequency based on the calculated reference wheel speed; a deviation calculating unit 321b for calculating the deviation between the reference wheel speed and wheel speed sensor values (i.e., wheel speed variation); a GEO conversion unit 321c for converting the deviation calculated by the deviation calculating unit 321b to a suspension stroke amount; a stroke speed calibrating unit 321d for calibrating the converted stroke amount to a stroke speed; and a signal processing unit 321e for applying a band elimination filter corresponding to the frequency calculated by the tire rotational vibration frequency calculating unit 321a to the calibrated value from the stroke speed calibrating unit 321d, to eliminate a primary tire rotational vibration component, and calculate a final stroke speed.

(Reference Wheel Speed Calculator Unit)

Figure 6:
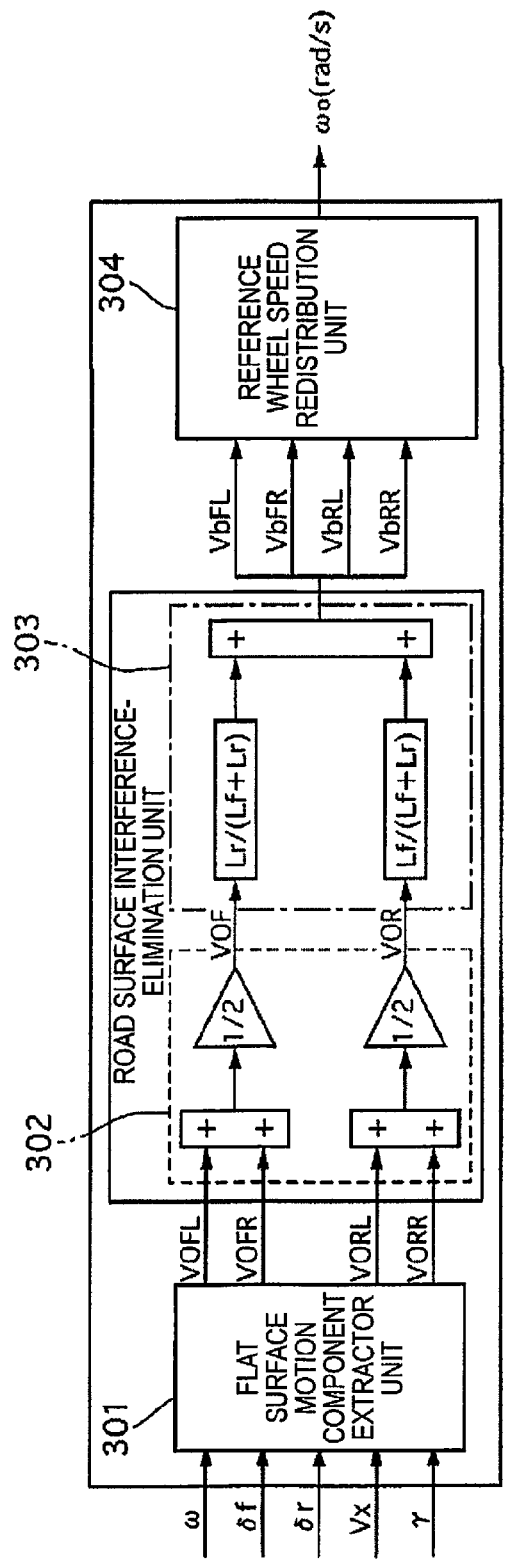
FIG. 6 is a block diagram showing the configuration of a reference wheel speed calculator unit of the first embodiment.

The reference wheel speed calculator unit 300 will now be described. FIG. 6 is a block diagram showing the configuration of a reference wheel speed calculator unit of the first embodiment. The reference wheel speed indicates a value from which various types of interference have been eliminated from each of the wheel speeds. In other words, the difference between a wheel speed sensor value and the reference wheel speed is a value related to a component that varies according to a stroke generated by vehicle body bouncing behavior, rolling behavior, pitching behavior, or unsprung vertical vibration; in the present embodiment, the stroke speed is calculated based on this difference.

A flat surface motion component extractor unit 301, using the wheel speed sensor values as inputs, calculates a first wheel speed V0 as a reference wheel speed for each of the wheels based on a vehicle body plan view model. $\omega$(rad/s) is the wheel speed sensor value detected by the wheel speed sensor 5, $\delta f$ (rad) is a front wheel actual steering angle detected by the steering angle sensor 7, $\delta r$ (rad) is a rear wheel actual steering angle, Vx is vehicle body lateral speed, $\gamma$(rad/s) is the yaw rate detected by the integrated sensor 6, V (m/s) is a vehicle body speed estimated from the calculated reference wheel speed $\omega 0$, VFL, VFR, VRL, and VRR are the reference wheel speeds to be calculated, Tf is a front wheel tread, Tr is a rear wheel tread, Lf is the distance to the front wheels from the location of the vehicle center of gravity, and Lr is the distance to the rear wheels from the location of the vehicle center of gravity. The vehicle body plan view model is expressed as follows, using the symbols described above.

$$VFL=(V-Tf/2\cdot\gamma)\cos\delta f+(Vx+Lf\cdot\gamma)\sin\delta f$$

$$VFR=(V+Tf/2\cdot\gamma)\cos\delta f+(Vx+Lf\cdot\gamma)\sin\delta f$$

$$VRL=(V-Tr/2\cdot\gamma)\cos\delta r+(Vx-Lr\cdot\gamma)\sin\delta r$$

$$VRR=(V+Tr/2\cdot\gamma)\cos\delta r+(Vx-L\cdot\gamma)\sin\delta r \quad \text{(Formula 1)}$$

Assuming normal driving in which no lateral sliding of the vehicle, a "0" may be input for the vehicle body lateral speed Vx. When rewritten with values based on V in the respective formulas, the expressions are as follows. When rewritten in this manner, V is denoted as V0FL, V0FR, V0RL, and V0RR (equivalent to first wheel speeds) as values corresponding to the respective wheels.

$$V0FL=\{VFL-Lf\gamma\sin\delta f\}/\cos\delta f+Tf/2\cdot\gamma$$

$$V0FR=\{VFR-Lf\gamma\sin\delta f\}/\cos\delta f-Tf/2\cdot\gamma$$

$$V0RL=\{VRL+Lr\cdot\gamma \sin \delta r\}/\cos \delta r+Tr/2\cdot\gamma$$

$$V0RR=\{VRR+Lf\cdot\gamma \sin \delta f\}/\cos \delta R-Tr/2\cdot\gamma \quad \text{(Formula 2)}$$

A roll interference elimination unit 302, using the first wheel speed V0 as input, calculates second wheel speeds V0F, V0R as reference wheel speeds for the front and rear wheels based on a vehicle body front view model. The vehicle body front view model is used to eliminate wheel speed differences produced by rolling motion occurring around a center of roll rotation on a vertical line passing through the vehicle center of gravity, when the vehicle is viewed from the front, and is represented by the following formulas.

$$V0F=(V0FL+V0FR)/2$$

$$V0R=(V0RL+V0RR)/2$$

This yields second wheel speeds V0F, V0R from which roll-based interference has been eliminated.

A pitch interference elimination unit 303, using the second wheel speeds V0F, V0R as inputs, calculates third wheel speeds VbFL, VbFR, VbRL, and VbRR constituting reference wheel speeds for all the wheels based on a vehicle body side view model. Here, the vehicle body side view model is one used to eliminate wheel speed differences produced by pitching motion occurring around a center of pitch rotation on a vertical line passing through the vehicle center of gravity, when the vehicle is viewed from the front, and is represented by the following formula.

$$VbFL=VbFR=VbRL=VbRR=\{Lr/(Lf+Lr)\}V0F+\{Lf/(Lf+Lr)\}V0R \quad \text{(Formula 3)}$$

A reference wheel speed redistribution unit 304 respectively substitutes VbFL (=VbFR=VbRL=VbRR) for V in the vehicle body plan view model shown in formula 1, to calculate final reference wheel speeds VFL, VFR, VRL, VRR for each wheel, each of which is divided by the tire radius r0 to calculate a reference wheel speed $\omega 0$.

Once the reference wheel speed $\omega 0$ has been calculated for each wheel through the process described above, deviation between this reference wheel speed $\omega 0$ and the wheel speed sensor values is calculated; because this deviation represents wheel speed variation associated with the suspension stroke, it is converted into a stroke speed Vzs. Basically, the stroke of suspension, when holding the wheels, takes place not just in the vertical direction; additionally the wheel rotational centers move forward or backward in association with the stroke, and the axles equipped with the wheel speed sensors 5 themselves become tilted, creating a difference in rotational angle from the wheels. Because this forward and backward motion leads to changes in wheel speed, deviations between the reference wheel speed and the wheel speed sensor values can be extracted by way of stroke-associated fluctuations. The extent of fluctuation that occurs can be set, as appropriate, according to the suspension geometry.

Once the stroke speeds Vz_sFL, Vz_sFR, Vz_sRL, Vz_sRR for each wheel have been calculated by the stroke speed calculator unit 321 according to the process described above, a sprung mass speed calculating unit 322 calculates a bounce rate, a roll rate, and a pitch rate, for use in skyhook control.

(Estimation Model)

Skyhook control refers to a process whereby damping force is set based on the relationship between the stroke speed of the S/A 3 and the sprung mass speed, and the orientation of the sprung mass is controlled to achieve a flat driving state. Here, in order to achieve control of the orientation of the sprung mass through skyhook control, feedback of the sprung mass speed is necessary. Stroke speed is a value detectable from the wheel speed sensor 5, and since the sprung mass is not provided with a vertical acceleration sensor or the like, the sprung mass speed must be estimated using an estimation model. Issues pertaining to the estimation model, and the appropriate model configuration to adopt, will be discussed below.

Figure 7:
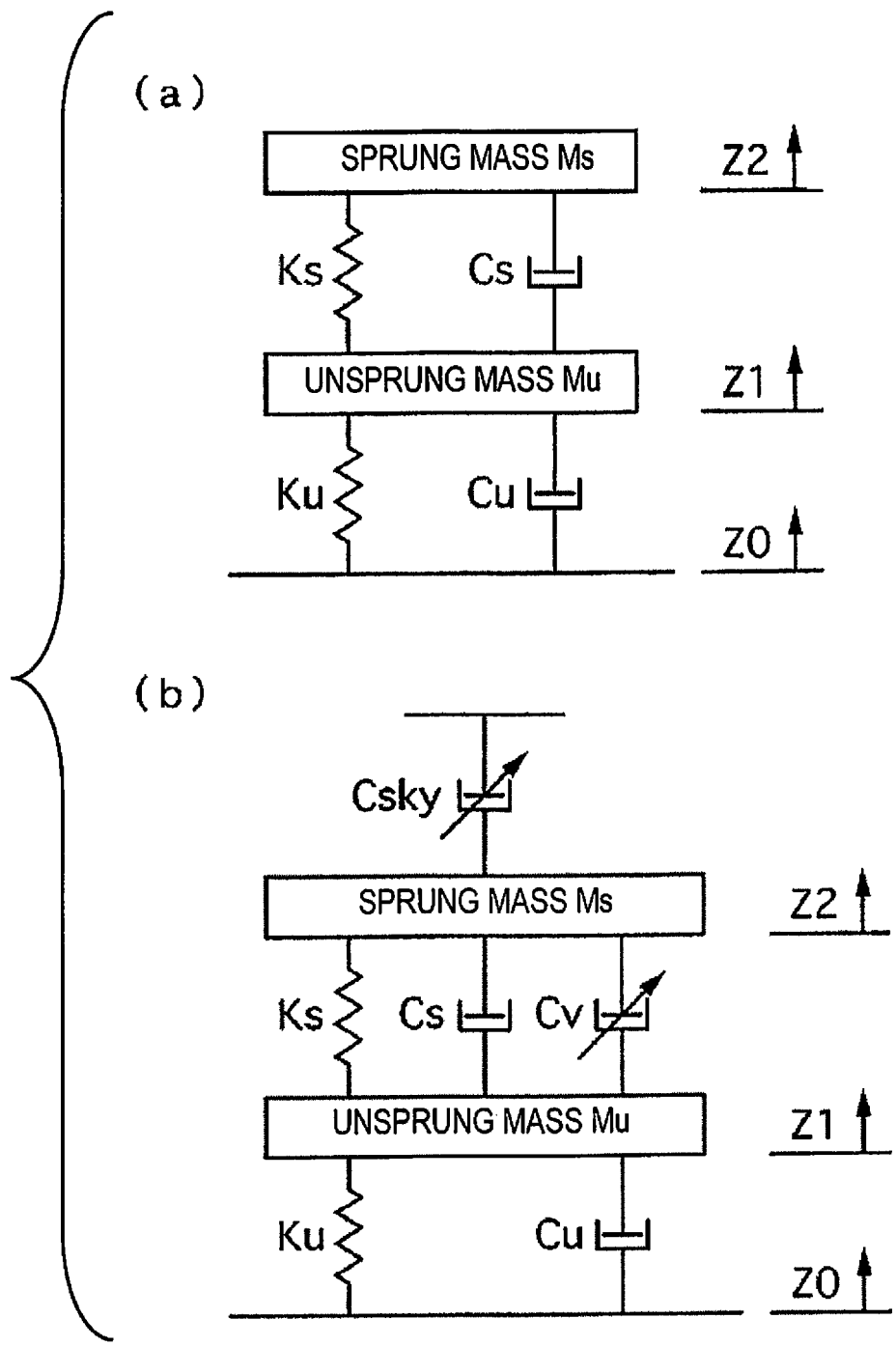
FIG. 7 is a schematic diagram showing a vehicle body vibration model.

FIG. 7 is a schematic diagram showing a vehicle body vibration model. FIG. 7(*a*) is a model for a vehicle provided with S/A having a constant damping force (hereafter referred to as a conventional vehicle), and FIG. 7(*b*) is a model of a case in which variable-damping force S/A are provided, and skyhook control is performed. In FIG. 7, Ms indicates the sprung mass, Mu indicates the unsprung mass, Ks indicates the coil spring modulus of elasticity, Cs indicates the S/A damping coefficient, Ku indicates the unsprung (tire) modulus of elasticity, Cu indicates the unsprung (tire) damping coefficient, and Cv indicates a variable damping coefficient. z2 indicates the position of the sprung mass, z1 indicates the position of the unsprung mass, and z0 indicates the position of the road surface.

In the case of using the conventional vehicle model shown in FIG. 7(*a*), the equation of motion for the sprung mass is expressed as follows. The first-order differential for z1 (i.e., speed) is represented by dz1, and the second-order differential (i.e., acceleration) is represented by ddz1.

$$Ms\cdot ddz2=-Ks(z2-z1)-Cs(dz2-dz1) \quad \text{(Estimation formula 1)}$$

Applying a Laplace transform to this relational expression yields the following formula.

$$dz2=-(1/Ms)\cdot(1/s^2)\cdot(Cs\cdot s+Ks)(dz2-dz1) \quad \text{(Estimation formula 2)}$$

Here, dz2−dz1 is the stroke speed (Vz_sFL, Vz_sFR, Vz_sRL, Vz_sRR), and therefore the sprung mass speed can be calculated from the stroke speed. However, modifying the damping force through skyhook control will greatly reduce estimation precision, creating the problem that, in the conventional vehicle model, a large orientation control force (damping force modification) cannot be applied.

However, the use of a skyhook control-based vehicle model like that shown in FIG. 7(*b*) is conceivable. Modification of the damping force basically involves modifying the force which limits the piston movement speed of the S/A 3 associated with the suspension stroke. Due to the fact that semi-active S/A 3, in which the pistons cannot be actively moved in a desired direction, are employed, a semi-active skyhook model is adopted, and the calculation of the sprung mass speed is as follows.

$$dz2=-(1/Ms)\cdot(1/s^2)\cdot\{(CS+CV)\cdot s+Ks\}(dz2-dz1)(\text{Estimation formula 3})$$

Here, if $dz2\cdot(dz2-dz1)\geq 0$, then $Cv=Csky\cdot\{dz21(dz2-dz1)\}$, and if $dz2\cdot(dz2-dz1)<0$, then $Cv=0$.

That is, Cv is a discontinuous value.

In cases in which it is desired to estimate sprung mass speed using a simple filter in a semi-active skyhook model, when the model itself is viewed as the filter, the variables will be equivalent to the filter coefficients, and the pseudo-differential term $\{(Cs+Cv)\cdot s+Ks\}$ includes a discontinuous variable damping coefficient Cv; therefore, filter response is unstable, and suitable estimation precision cannot be obtained. In particular, unstable filter response will lead to shifting of phase. Skyhook control cannot be accomplished if the correspondence relationship of the phase and the sign of sprung mass speed breaks down. It was therefore decided to estimate the sprung mass speed by using an active skyhook model, in which it is possible to use a stable Csky directly without relying upon the sign relationship of sprung mass speed and stroke speed, even in cases in which semi-active S/A 3 are used. Where the active skyhook model is adopted, the calculation of sprung mass speed is as follows.

$$dz2=-(1/s)\cdot 1/(s+Csky/Ms)\}\cdot \{(Cs/Ms)s+(Ks/Ms)\}(dz2-dz1) \quad \text{(Estimation formula 4)}$$

In this case, the pseudo-differential term $\{(Cs/Ms)s+(Ks/Ms)\}$ does not give rise to discontinuity, and the term $\{1/(s+Csky/Ms)\}$ can be constituted by a low-pass filter. Filter response is therefore stable, and suitable estimation precision can be obtained. It should be noted that, despite adopting the active skyhook model here, in actual practice only semi-active control is possible, and thus, the controllable range is halved. The magnitude of the estimated sprung mass speed is therefore less than the actual speed in the frequency band below sprung mass resonance; however, as phase is the most important element in skyhook control, skyhook control can be achieved as long as the correspondence between phase and sign can be maintained; the magnitude of the sprung mass speed can be adjusted using the other coefficients or the like, and therefore does not pose a problem.

From the above relationship, it will be appreciated that sprung mass speed can be estimated, provided that the stroke speed of each wheel is known. Because an actual vehicle has not one wheel, but four, estimation of the state of the sprung mass using the stroke speed of each wheel, through modal decomposition to roll rate, pitch rate, bounce rate, will be examined next. When calculating the abovementioned three components from the stroke speeds of the four wheels, one corresponding component is lacking, leading to an indefinite solution; thus, warp rate, which indicates movement of diagonally opposed wheels, has been introduced. Where xsB denotes the bounce term, xsR the roll term, xsP the pitch term, and xsW the warp term of the stroke amount, and z_sFL, z_sFR, z_sRL, z_sRR denote stroke amounts corresponding to Vz_sFL, Vz_sFR, Vz_sRL, Vz_sRR, the following formula is true.

$$\begin{Bmatrix} z\_sFL \\ z\_sFR \\ z\_sRL \\ z\_sRR \end{Bmatrix} = \begin{bmatrix} 1 & 1 & -1 & -1 \\ 1 & -1 & -1 & 1 \\ 1 & 1 & 1 & 1 \\ 1 & -1 & 1 & -1 \end{bmatrix} \begin{Bmatrix} xsB \\ xsR \\ xsP \\ xsW \end{Bmatrix} \Rightarrow \begin{Bmatrix} xsB \\ xsR \\ xsP \\ xsW \end{Bmatrix} = \quad \text{(Formula 1)}$$

$$\begin{bmatrix} 1 & 1 & -1 & -1 \\ 1 & -1 & -1 & 1 \\ 1 & 1 & 1 & 1 \\ 1 & -1 & 1 & -1 \end{bmatrix}^{-1} \begin{Bmatrix} z\_sFL \\ z\_sFR \\ z\_sRL \\ z\_sRR \end{Bmatrix}$$

From the relational expression shown above, the differentials dxsB, ... of xsB, xsR, xsP, xsW may be expressed by the following formulas.

$$dxsB=1/4(Vz\_sFL+Vz\_sFR+Vz\_sRL+Vz\_sRR)$$

$$dxsR=1/4(Vz\_sFL-Vz\_sFR+Vz\_sRL-Vz\_sRR)$$

$$dxsP=1/4(-Vz\_sFL-Vz\_sFR+Vz\_sRL+Vz\_sRR)$$

$$dxsW=1/4(-Vz\_sFL+Vz\_sFR+Vz\_sRL-Vz\_sRR)$$

Here, the relationship of sprung mass speed and stroke speed is obtained from estimation formula 4 above; thus, in estimation formula 4, where the part $-(1/s)\cdot\{1/(s+Csky/Ms)\}\cdot\{(Cs/Ms)s+(Ks/Ms)\}$ is denoted as G; values which take into account modal parameters according to the bounce term, roll term, and pitch term of Csky, Cs, and Ks, respectively (CskyB, CskyR, CskyP, CsB, CsR, CsP, KsB, KsR, KsP) are denoted as GB, GR, and GP; and the bounce rate is denoted as dB, the roll rate as dR, and the pitch rate as dP, the following values of dB, dR, and dP can be calculated.

$$dB=GB\cdot dxsB$$

$$dR=GR\cdot dxsR$$

$$dP=GP\cdot dxsP$$

As shown above, estimates of the state of the sprung mass of an actual vehicle can be accomplished based on the stroke speeds for the various wheels.

(Sprung Mass Vibration Damping Control Unit)

Next, the configuration of the skyhook control executed in the sprung mass vibration damping control unit 101a, the skyhook control unit 201, and the sprung mass vibration damping control unit 33 will be described. During skyhook control, control is carried out to bring the sprung mass state that was estimated based on wheel speed in the aforedescribed manner, to a target sprung mass state. In other words, changes in wheel speed are changes corresponding to the sprung mass state, and in cases in which the sprung mass state, i.e., bounce, roll, and pitch, is controlled to a target sprung mass state, control is carried out such that changes in the detected wheel speed are equal to wheel speed changes corresponding to the target sprung mass state.

(Configuration of Skyhook Control Unit)

The vehicle control device according to the first embodiment is provided with three actuators for achieving sprung mass orientation control, namely, the engine 1, the brakes 20, and the S/A 3. Of these, the two elements of bounce rate and pitch rate are targeted for control by the sprung mass vibration damping control unit 101a in the engine controller 1a; the pitch rate is targeted for control by the skyhook control unit 201 in the brake controller 2a; and the three elements of bounce rate, roll rate, and pitch rate are targeted for control by the skyhook control unit 33a in the S/A 3.

The skyhook control amount in the bounce direction is:

$$FB=CskyB\cdot dB$$

The skyhook control amount in the roll direction is:

$$FR=CskyR\cdot dR$$

The skyhook control amount in the pitch direction is:

$$FP=CskyP\cdot dP$$

(Skyhook Control Amount FB in the Bounce Direction)

The skyhook control amount FB in the bounce direction is calculated as part of the engine orientation control amount in the sprung mass vibration damping control unit 101a, and is also calculated as part of the S/A orientation control amount in the skyhook control unit 33a.

(Skyhook Control Amount FR in the Roll Direction)

The skyhook control amount FR in the roll direction is calculated as part of the S/A orientation control amount in the skyhook control unit 33a.

(Skyhook Control Amount FP in the Pitch Direction)

The skyhook control amount FP in the pitch direction is calculated as part of the engine orientation control amount in the sprung mass vibration damping control unit 101a, calculated as part of the brake orientation control amount in the skyhook control unit 201, and also calculated as part of the S/A orientation control amount in the skyhook control unit 33a.

In the engine orientation control unit 101, there is established a limit value for limiting the engine torque control amount according to the engine orientation control amount, so as to avoid discomfort for the driver. In so doing, the engine torque control amount, when converted to forward/reverse acceleration, is limited to within a prescribed forward/reverse acceleration range. Therefore, when calculating an engine orientation control amount (engine torque control amount based on FB or FP, when a value at or above the limit value is calculated, an engine orientation control amount is output by way of a skyhook control amount for bounce rate or pitch rate achievable at the limit value. In the engine control unit 102, an engine torque control amount is calculated based on the engine orientation control amount corresponding to the limit value, and is output to the engine 1.

In the skyhook control unit 201, as in the engine 1, there is established a limit value for limiting the braking torque control amount so as to avoid discomfort for the driver (the limit value will be discussed in detail below). In so doing, the braking torque control amount, when converted to forward/reverse acceleration, is limited to within a prescribed forward/reverse acceleration range (a limit value derived from passenger discomfort, actuator life, or the like). Therefore, when calculating a brake orientation control amount based on FP, when a value at or above the limit value is calculated, a pitch rate minimization amount (hereinafter denoted as "brake orientation control amount") achievable at the limit value is output to the brake control unit 202. In the brake control unit 202, a braking torque control amount is calculated based on the brake orientation control amount corresponding to the limit value, and is output to the brakes 20.

(Brake Pitch Control)

Figure 8:
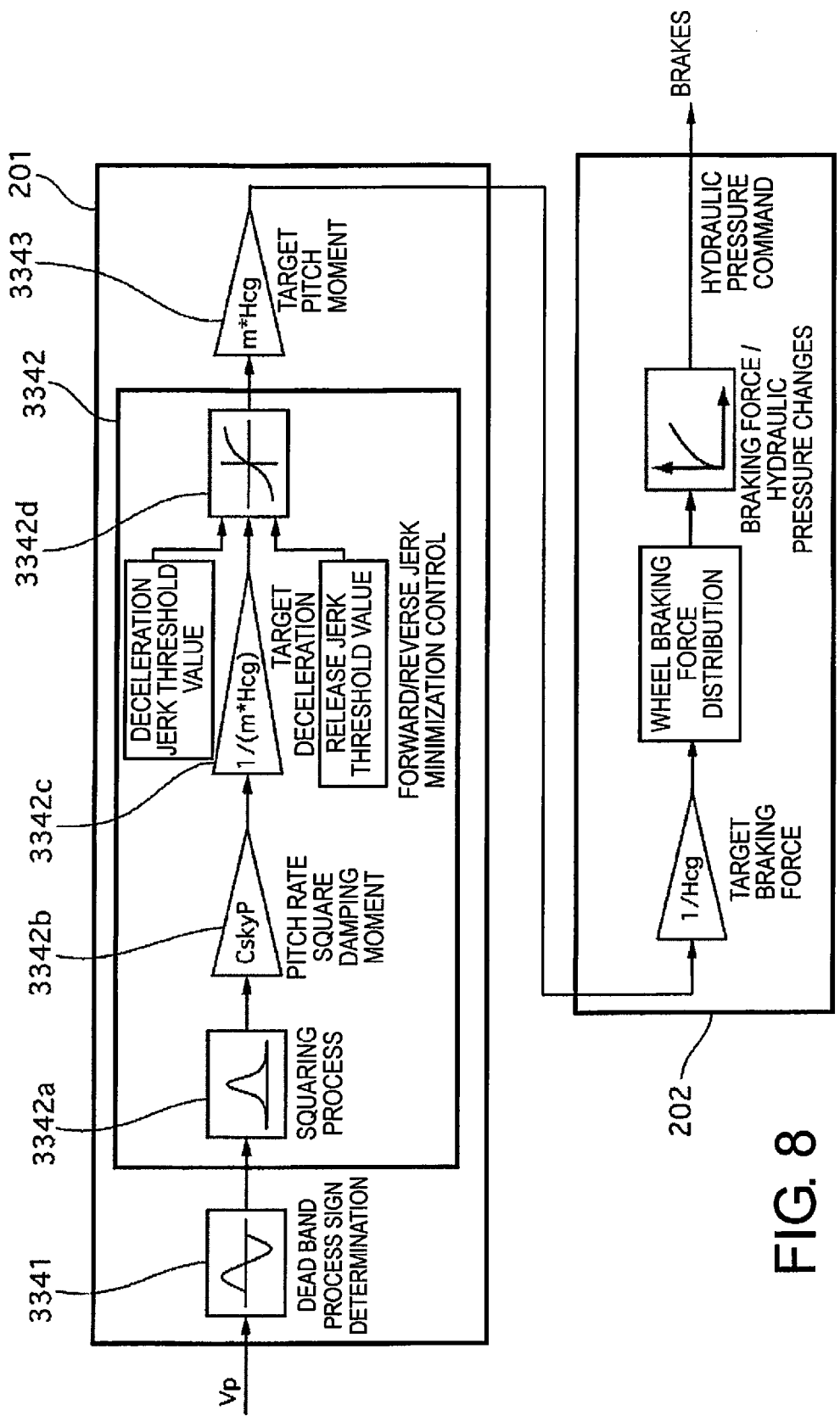
FIG. 8 is a control block diagram showing brake pitch control in the first embodiment.

Brake pitch control will now be described. Generally, the brakes 20 are capable of controlling both bounce and pitch; thus, it may be considered preferable for them to control both. However, when bounce control is performed by the brakes 20, braking force is generated in all four wheels simultaneously, and even in directions of low priority of control, there is a rather strong sensation of deceleration relative to the difficulty in producing a controlling effect, and this tends to subject the driver to discomfort. Thus, a configuration in which pitch control is performed in specialized fashion by the brakes 20 has been adopted. FIG. 8 is a control block diagram showing brake pitch control in the first embodiment. Defining m as the mass of the vehicle body, BFf as front wheel braking force, BFr as rear wheel braking force, Hcg as the height between the vehicle center of gravity and the road surface, a as vehicle acceleration, Mp as pitch moment, and Vp as pitch rate, the following relationships are true.

$$BFf + BFr = m \cdot a$$

$$m \cdot a \cdot Hcg = Mp$$

$$Mp = (BFf + BFr) \cdot Hcg$$

If braking force is applied when the pitch rate Vp is positive, i.e., when the front wheel side of the vehicle is sinking, the front wheel side will sink further, exacerbating the pitching motion; thus, braking force is not applied in such cases. On the other hand, when the pitch rate Vp is negative, i.e., the front wheel side of the vehicle is lifting, the braking pitch moment imparts braking force, minimizing lift at the front wheel side. This ensures the field of view for the driver, making it easier to see ahead, and contributing to an improved perception of safety and of flatness of ride. From the preceding, the following control amounts are applied:

when Vp>0 (front wheels sinking), Mp=0 when Vp≤0 (front wheels rising), Mp=CskyP·Vp

In so doing, braking torque is generated only when the front side of the vehicle rises, allowing the sense of deceleration produced thereby to be reduced, than when braking torque is generated both when the front side lifts and when it sinks. In addition, the frequency of operation of the actuators need only half the usual, allowing low-cost actuators to be used.

Based on the relationships described above, a brake orientation control amount calculating unit 334 is constituted from the following control blocks. In a dead band process sign determining unit 3341, the sign of the input pitch rate Vp is determined; when the sign is positive, no control is necessary, so a "0" is output to a deceleration perception-reduction process unit 3342, and when the sign is negative, control is determined to be possible, and a pitch rate signal is output to the deceleration perception-reduction process unit 3342.

(Deceleration Sense Reduction Process)

Next, a deceleration sense reduction process will be described. This process is one that corresponds to the limit created by the aforementioned limit value that was set in the brake orientation control amount calculating unit 334. A squaring process unit 3342*a* squares the pitch rate signal. This reverses the sign, and smooths the rise in control force. A pitch rate square damping moment calculating unit 3342*b* multiplies the squared pitch rate by a skyhook gain CskyP for the pitch term, which takes into account the squaring process, and calculates the pitch moment Mp. A target deceleration calculating unit 3342*c* divides the pitch moment Mp by the mass m and the height Hcg between the vehicle center of gravity and the road surface, and calculates target deceleration.

A jerk threshold value limiting unit 3342*d* determines whether the rate of change of the calculated target deceleration, i.e., jerk, is within pre-established ranges for a deceleration jerk threshold value and a release jerk threshold value, and whether the target deceleration is within a forward/reverse acceleration limit value range. When any of the threshold values is exceeded, the target deceleration is corrected to a value within the ranges for the jerk threshold values. When the target deceleration exceeds the limit value, it is set to within the limit value. It is thereby possible to produce a rate of deceleration such that discomfort for the driver does not result.

A target pitch moment conversion unit 3343 multiplies the limited target deceleration calculated by the jerk threshold value limiting unit 3342*d*, by the mass m and the height Hcg, and calculates a target pitch moment, which is outputted to the brake control unit 2*a*.

(Frequency-Sensitive Control Unit)

Next, a frequency-sensitive control process performed in the sprung mass vibration damping control unit will be described. In the first embodiment, basically, the sprung mass speed is estimated based on the values detected by the wheel speed sensors 5, and skyhook control is performed on the basis thereof, to thereby accomplish sprung mass vibration damping control. However, there are cases in which, conceivably, sufficient estimation accuracy from the wheel speed sensors 5 is not guaranteed, and cases in which it is desirable to actively guarantee a comfortable driving state (i.e., a soft ride rather than a vehicle body flat sensation) depending on driving conditions or the driver's wishes. In such cases, with vector control in which the relationship (phase, etc.) of the signs of the stroke speed and the sprung mass speed is important, such as in the case of skyhook control, owing to slight phase shifts, it may prove difficult to bring about suitable control, and therefore frequency-sensitive control, involving sprung mass vibration damping control according to vibration profile scalar quantities, is introduced.

Figure 9:
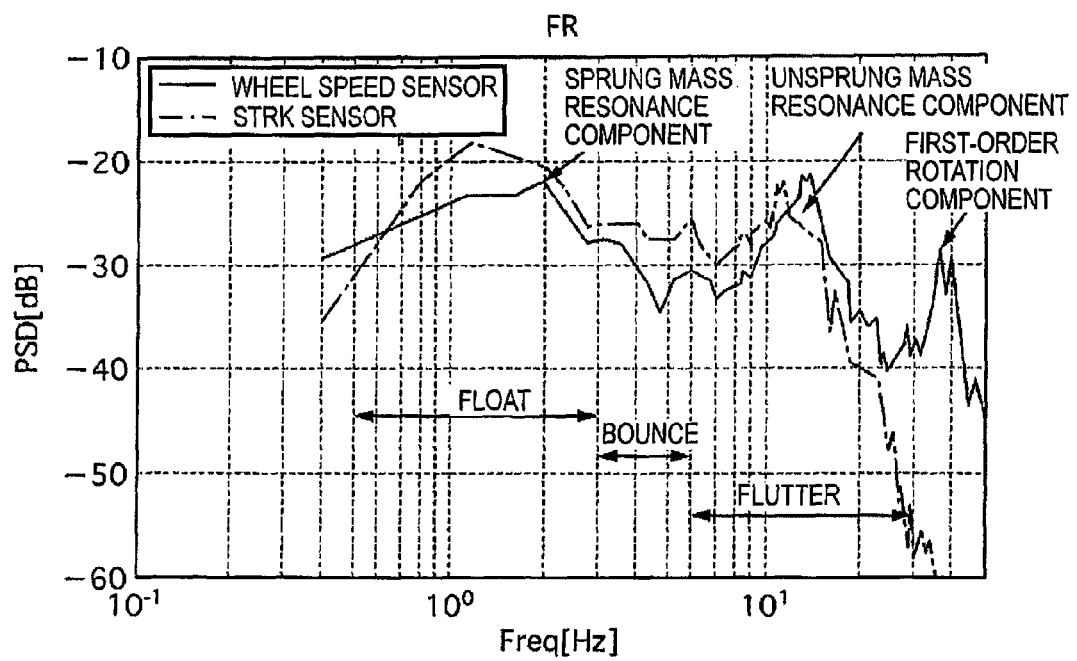
FIG. 9 is a graph simultaneously showing a wheel speed frequency profile detected by a wheel speed sensor, and a stroke frequency profile from a stroke sensor not installed in the present embodiment.

FIG. 9 is a diagram simultaneously depicting a wheel speed frequency profile detected by a wheel speed sensor, and a stroke frequency profile from a stroke sensor, not installed in the present embodiment. Here, "frequency profile" refers to a profile in which the magnitude of amplitude versus the frequency is plotted on the y axis as a scalar quantity. A comparison of the frequency component of the wheel speed sensor 5 and the frequency component of the stroke sensor shows that roughly similar scalar quantities can be plotted from the sprung mass resonance frequency component to the unsprung mass resonance frequency component. Thus, the damping force has been set based on this frequency profile, from among the values detected by the wheel speed sensor 5. Here, the region in which the sprung mass resonance frequency component lies is a frequency region in which a passenger has a perception of floating in air due to swaying of the passenger's entire body, or stated another way, a perception that gravitational acceleration acting the passenger has decreased, and is designated as a float region (0.5-3 Hz). A region between the sprung mass resonance frequency component and the unsprung mass resonance frequency component is a frequency region in which, although there is no perception of reduced gravitational acceleration, there is a perception resembling quick, frequent bouncing experienced by a person on horseback when riding at a trot, or stated another way, a perception of up-and-down motion which the entire body is capable of following, and is referred to as the bounce region (3-6 Hz). The region in which the unsprung mass resonance frequency component lies is a frequency region in which, although vertical movement to an extent that is followed by the body's mass is not experienced, quivering vibration is transmitted to part of the passenger's body, i.e., the thighs, and is referred to as a flutter region (6-23 Hz).

Figure 10:
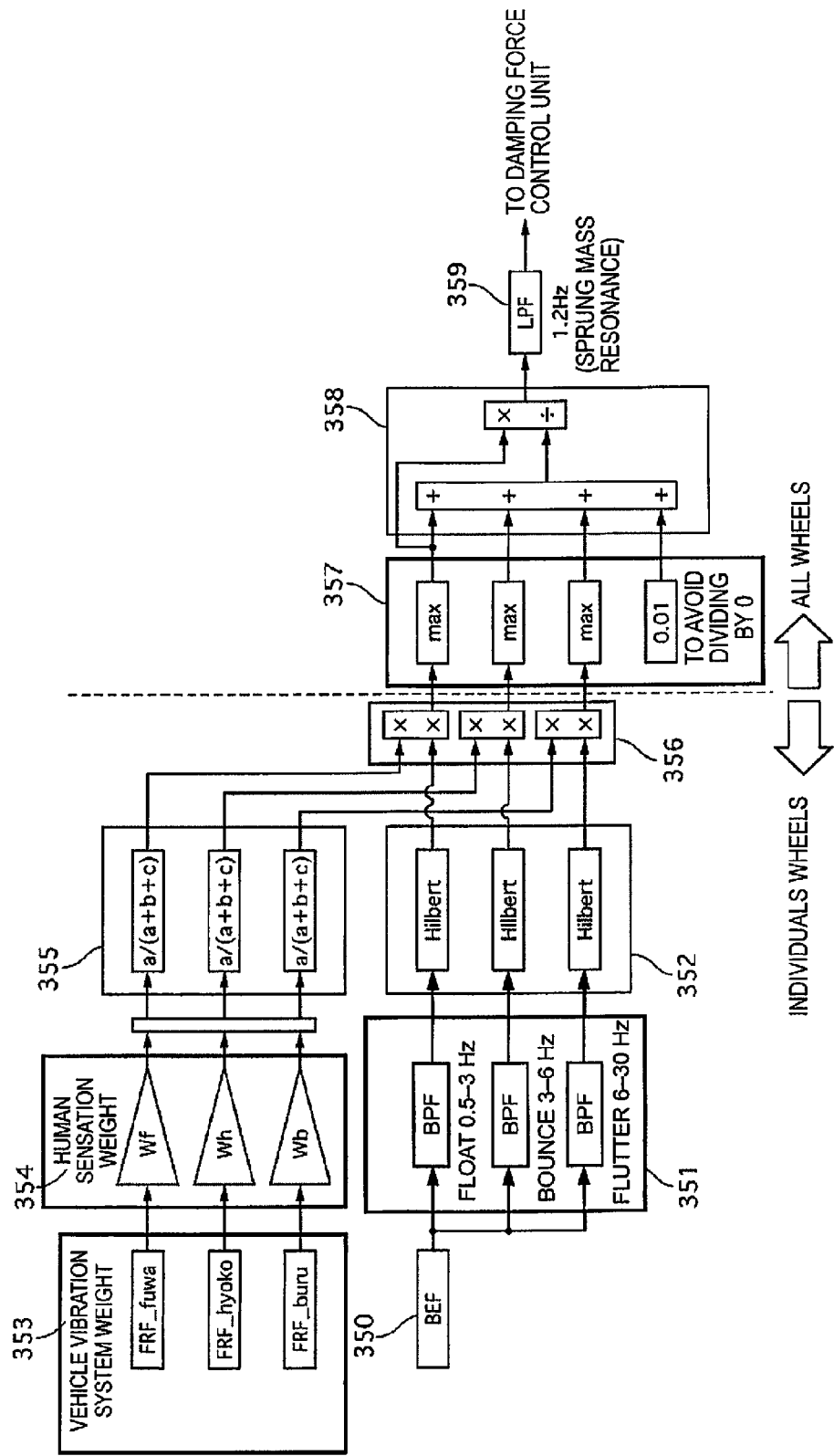
FIG. 10 is a control block diagram showing frequency-sensitive control in sprung mass vibration damping control in the first embodiment.

FIG. 10 is a control block diagram showing frequency-sensitive control in sprung mass vibration damping control in the first embodiment. From the wheel speed sensor values, a band elimination filter 350 cuts out noise other than the vibration component used to perform control. A predetermined frequency region splitting unit 351 splits the region into the respective frequency bands of a float region, a bounce region, and a flutter region. A Hilbert transform processing unit 352 performs a Hilbert transform upon the split frequency bands, converting them to scalar quantities (specifically, areas calculated using amplitude and frequency band) based on the amplitude of the frequency. A vehicle vibrational system weighting unit 353 establishes weights for actual propagation of vibration to the vehicle in the float region, the bounce region, and the flutter region frequency bands. A human sensation weighting unit 354 establishes weights for propagation of vibration to passengers in the float region, the bounce region, and the flutter region frequency bands.

Figure 11:
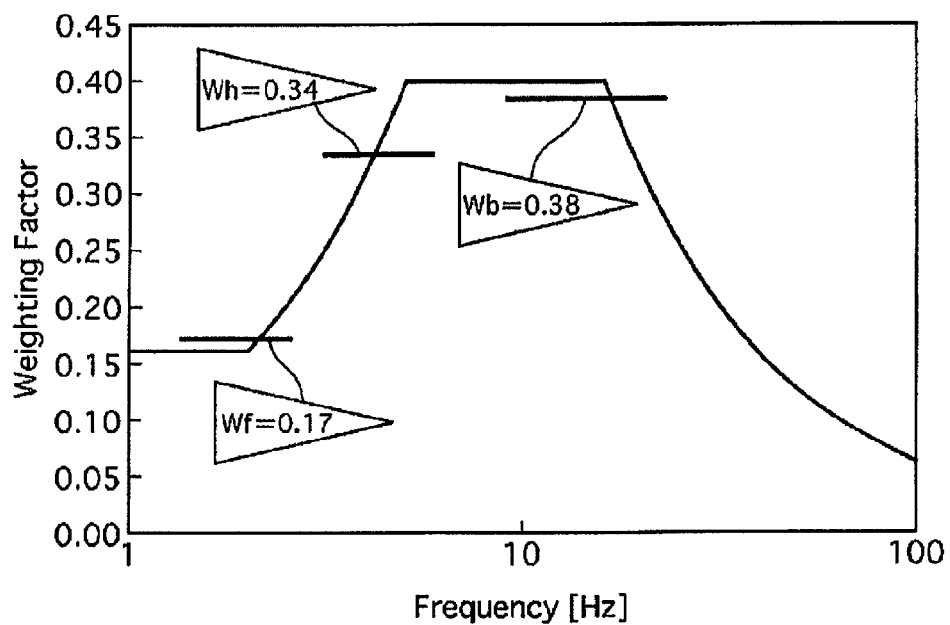
FIG. 11 is a correlation graph showing human sensation profiles in different frequency regions.

The establishment of human sensation weights will now be described. FIG. 11 is a correlation graph showing a human sensation profile plotted against frequency. As shown in FIG. 11, passenger sensitivity to frequencies is comparatively low in the float region, which is a low-frequency region, with sensitivity gradually increasing in the course of transition to regions of higher frequency. Frequencies in high-frequency regions at and above the flutter region become progressively harder to transmit to the passenger. In view of this, the float region human sensation weight Wf is set to 0.17, the bounce region human sensation weight Wh is set to 0.34 which is higher than Wf, and the flutter region human sensation weight Wb is set to 0.38 which is higher than Wf and Wh. It is thereby possible to increase the correlation between the scalar quantities of the various frequency bands, and the vibration actually propagated to passengers. These two weighting factors may be modified, as appropriate, according to vehicle concept or passenger preferences.

From among the frequency band weights, the weight-determining means 355 calculates the proportions occupied by the weight for each of the frequency bands. Defining a as the float region weight, b as the bounce region weight, and c as the flutter region weight, the weighting factor for the float region is (a/(a+b+c)), the weighting factor for the bounce region is (b/(a+b+c)), and the weighting factor for the flutter region is (c/(a+b+c)). A scalar quantity calculating unit 356 multiplies the scalar quantities of the frequency bands calculated by the Hilbert transform processing unit 352, by weights calculated in the weight-determining means 355, and outputs final scalar quantities. The process up to this point is performed on the wheel speed sensor values for each of the wheels.

A maximum value-selection unit 357 selects the maximum value from among the final scalar quantities calculated for each of the four wheels. The value 0.01 appearing at the bottom has been established to avoid having 0 as a denominator, as the total of the maximum values is used as a denominator in a subsequent process. A proportion calculating unit 358 calculates a proportion, using the total of the maximum scalar quantity values for each of the frequency bands as the denominator, and the maximum scalar quantity value of the frequency band corresponding to the float region as the numerator. In other words, the proportion of contamination (hereafter, simply "proportion") in the float region contained in all vibration components is calculated. A sprung mass resonance filter 359 performs a filter process having a sprung mass resonance frequency of roughly 1.2 Hz on the calculated proportion, and extracts from the calculated proportion a sprung mass resonance frequency band component representing the float region. In other words, because the float region exists at approximately 1.2 Hz, it is believed that the proportion of this region will also vary around 1.2 Hz. The final extracted proportion is then output to the damping force control unit 35, and a frequency-sensitive damping force control amount in accordance with the proportion is output.

Figure 12:
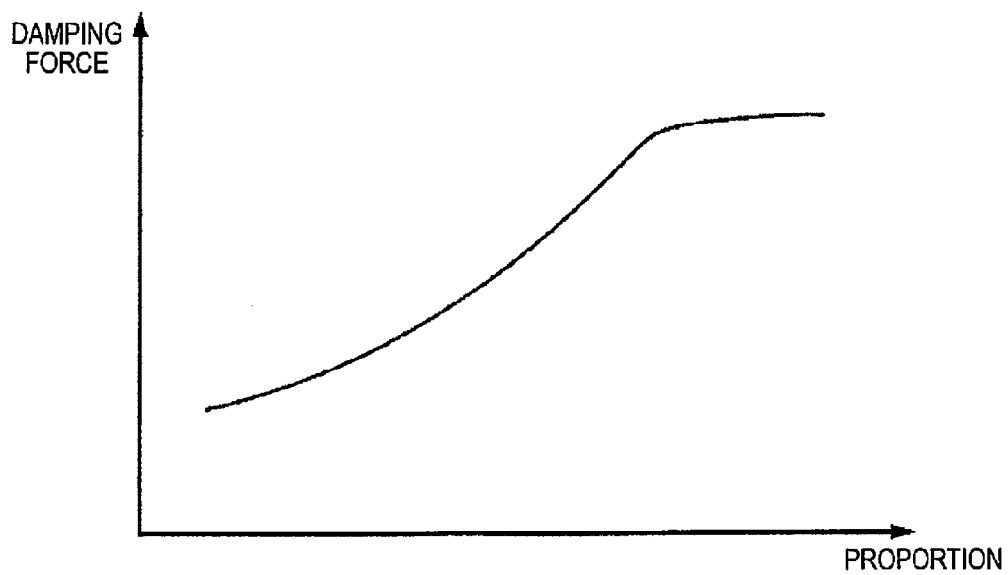
FIG. 12 is a plot showing the relationship between the proportion of vibration contamination and damping force in a float region in the frequency-sensitive control of the first embodiment.

FIG. 12 is a plot showing the relationship between damping force and the proportion of vibration contamination of the float region, produced by frequency-sensitive control in the first embodiment. As shown in FIG. 12, a high damping force level is established when the float region occupies a large proportion, thereby reducing the vibration level of sprung mass resonance. Even when high damping force is established, because the proportions of the bounce region and the flutter region are small, no high-frequency vibration or bouncy vibration is transmitted to passengers. Meanwhile, establishing a low level of damping force when the float region proportion is small reduces the vibration transmission profile at and above the sprung mass resonance, minimizing high-frequency vibration and yielding a smooth ride.

Figure 13:
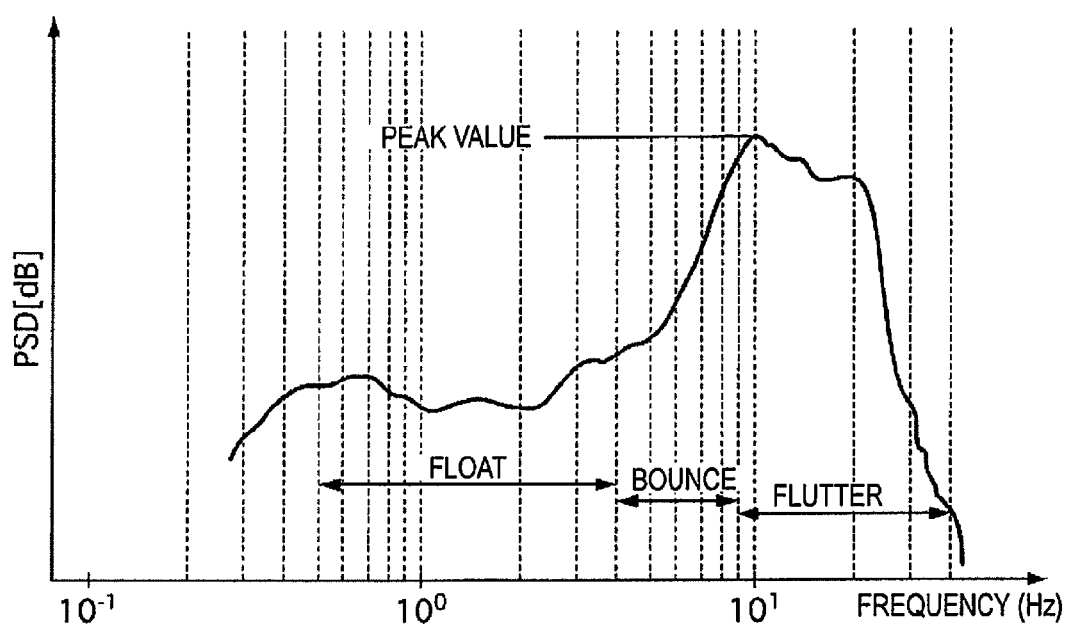
FIG. 13 is a diagram showing a wheel speed frequency profile detected by a wheel speed sensor in certain driving conditions.

The advantages of frequency-sensitive control in a comparison of frequency-sensitive control and skyhook control will now be described. FIG. 13 is a diagram showing a wheel speed frequency profile detected by a wheel speed sensor 5 under certain driving conditions. This profile is especially observed during driving on a road surface having continuous small irregularities, such as cobbles. When skyhook control is performed while driving on a road surface exhibiting this profile, the problem arises that, because in skyhook control, the damping force is determined from the peak amplitude value, any degradation in phase estimation for high-frequency vibrational input will cause an extremely high damping force to be established at incorrect timing, leading to exacerbation of high-frequency vibration. By contrast, if control is performed based on scalar quantities rather than vectors, as in frequency-sensitive control, the float region occupies a small proportion on road surface as shown in FIG. 13, leading to establishment of low damping force. Thus, even if the amplitude of flutter region vibration is high, the vibration transmission profile is sufficiently reduced, allowing the exacerbation of high-frequency vibration to be avoided. As shown by the foregoing, high-frequency vibration can be minimized through frequency-sensitive control based on scalar quantities, in regions where control is difficult due to degraded phase estimation precision even if skyhook control is performed using expensive sensors.

(S/A Driver Input Control Unit)

The S/A driver input control unit will be described next. In the S/A driver input control unit 31, based on signals from the steering angle sensor 7 and the vehicle speed sensor 8, a driver input damping force control amount, corresponding to the vehicle behavior the driver wishes to achieve, is calculated and is output to the damping force control unit 35. For example, when the nose end of the vehicle rises during turning by the driver, the driver's field of view will tend to diverge from the road surface, and therefore in this case, four-wheel damping force is output as the driver input damping force control amount, so as to prevent the nose from rising. Additionally, a driver input damping force control amount for minimizing roll occurring during the turn is output.

(Roll Control Through S/A-Side Driver Input Control)

Figure 14:
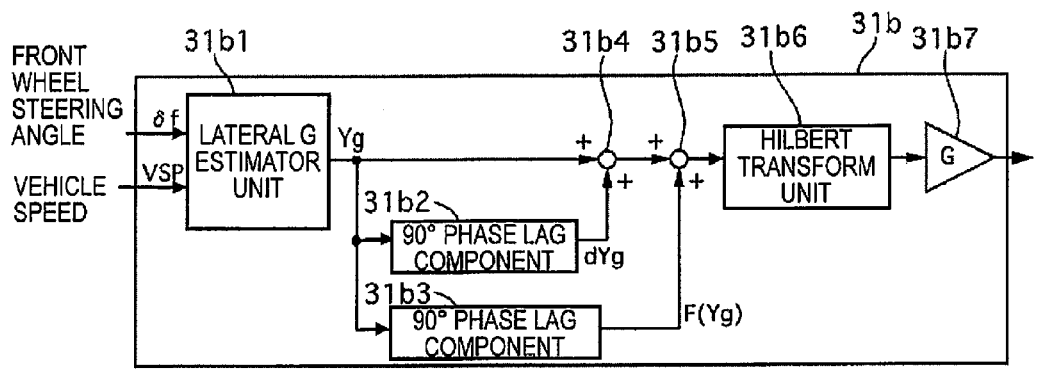
FIG. 14 is a control block diagram showing a configuration of roll rate minimization control in the first embodiment.

Control to minimize roll, performed through S/A-side driver input control, will be described here. FIG. 14 is a control block diagram showing a configuration of roll rate minimization control in the first embodiment. In a lateral acceleration estimating unit 31$b$1, lateral acceleration Yg is estimated based on the front wheel steering angle of detected by the steering angle sensor 7, and vehicle speed VSP detected by the vehicle speed sensor 8. This lateral acceleration Yg is calculated from the following formula, based on a vehicle body plan view model.

$$Yg=(VSP^2/(1+A\cdot VSP^2))\cdot \delta f$$

In a 90° phase-lead component creation unit 31$b$2, the estimated lateral acceleration Yg is differentiated, and a lateral acceleration differentiation value dYg is output. In a first adder unit 31$b$4, the lateral acceleration Yg and the lateral acceleration differentiation value dYg are added. In a 90° phase-lag component creation unit 31$b$3, a component F (Yg) in which the phase of the estimated lateral acceleration Yg lags by 90° is output. In a second adder unit 31$b$5, F (Yg) is added to the value added in the first adder unit 31$b$4. In a Hilbert transform unit 31$b$6, a scalar quantity based on an envelope waveform of the added value is calculated. In a gain multiplication unit 31$b$7, a gain is multiplied by the scalar quantity based on the envelope waveform, and a driver input orientation control amount for roll rate minimization control purposes is calculated, and output to the damping force control unit 35.

Figure 15:
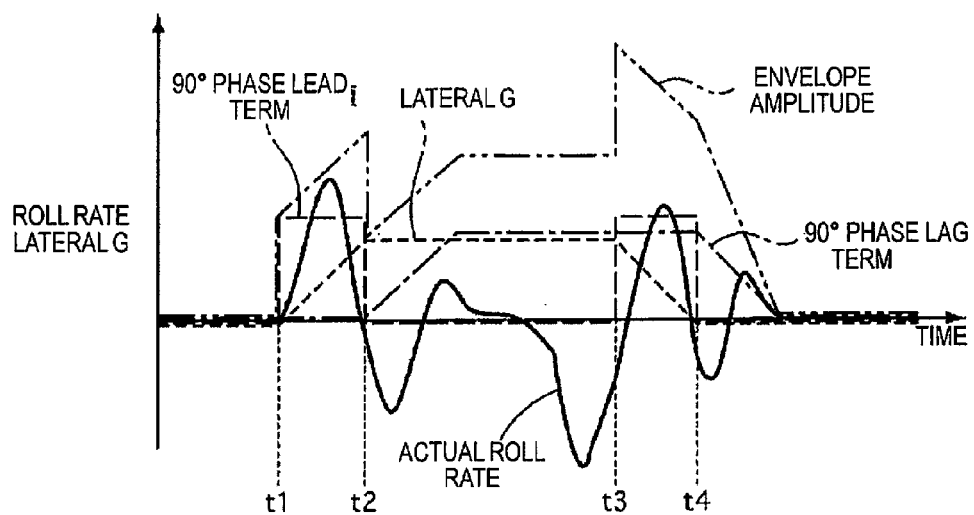
FIG. 15 is a time chart showing an envelope waveform shaping process for roll rate minimization control in the first embodiment.

FIG. 15 is a time chart showing an envelope waveform shaping process for roll rate minimization control in the first embodiment. When steering is initiated by the driver at time t1, a roll rate begins to be generated gradually. At this time, by shaping an envelope waveform by adding the 90° phase-lead component, and calculating a driver input orientation control amount based on a scalar quantity based on the envelope waveform, generation of the roll rate in the initial phase of steering can be minimized. Next, as the driver enters a steering state at time t2, the 90° phase-lead component dYg disappears, and now the phase-lag component F (Yg) is added. At this time, even in a case in which there is not much change in the roll rate in the steady turning state, subsequent to initial roll, there is generated a roll rate resonance component which corresponds to roll backlash. Supposing that the phase-lag component F (Yg) had not been added, the damping force would be set to a small value from time t2 to time t3, posing the risk of destabilization of vehicle behavior by the roll rate resonance component. The 90° phase-lag component F (Yg) contributes to minimizing this roll rate resonance component.

When the driver transitions from the steering state to straight forward driving at time t3, the lateral acceleration Yg becomes less, and the roll rate also converges on a small value. Here, because damping force has been solidly ensured through the action of the 90° phase-lag component F (Yg), destabilization of vehicle behavior due to the roll rate resonance component can be avoided.

(Unsprung Mass Vibration Damping Control Unit)

Next, the configuration of the unsprung mass vibration damping control unit will be described. As discussed in the context of the conventional vehicle shown in FIG. 7($a$), a resonance frequency band also exists in the tires, as they possess both a modulus of elasticity and a damping coefficient. However, because a tire has a mass that is less than that of the sprung mass, and a high modulus of elasticity as well, the band exists to the high frequency end of the sprung mass resonance. This unsprung mass resonance component causes tire rumbling in the unsprung mass, potentially degrading ground contact. In addition, rumbling in the unsprung mass can be uncomfortable for passengers. Thus, damping force is established in response to the unsprung mass resonance component, in order to minimize unsprung mass resonance-induced rumbling.

Figure 16:
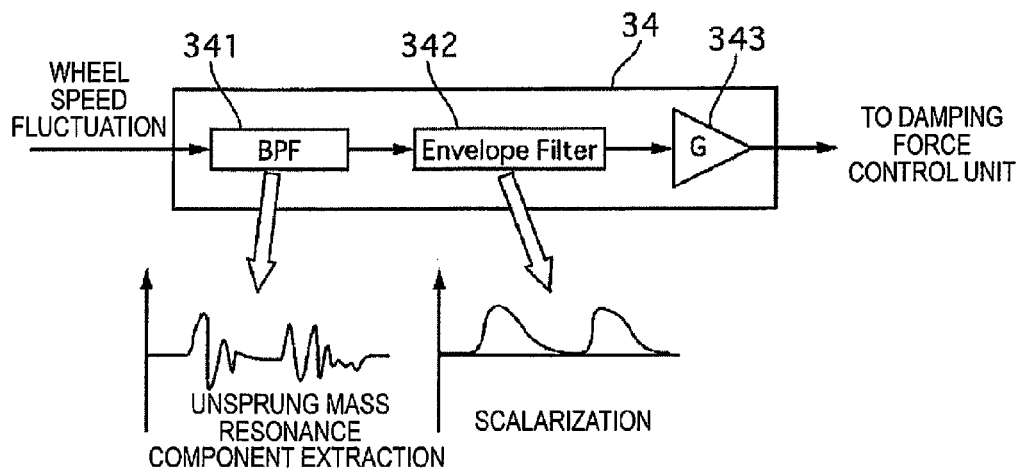
FIG. 16 is a block diagram showing a control configuration for unsprung mass vibration damping control in the first embodiment.

FIG. 16 is a block diagram showing a control configuration for unsprung mass vibration damping control in the first embodiment. An unsprung mass resonance component extraction unit 341 applies a band-pass filter to wheel speed fluctuations output from the deviation calculating unit 321$b$ of the driving state estimating unit 32, to extract an unsprung mass resonance component. The unsprung mass resonance component is extracted from the region at roughly 10-20 Hz within the wheel speed frequency component. An envelope waveform shaping unit 342 scalarizes the extracted unsprung mass resonance component, and using an envelope filter shapes an envelope waveform. A gain multiplication unit 343 multiplies the scalarized unsprung mass resonance component by a gain, and calculates an unsprung mass vibration damping force control amount, which is output to the damping force control unit 35. In the first embodiment, an unsprung mass resonance component is extracted by applying a band-pass filter to wheel speed fluctuations output from the deviation calculating unit 321$b$ of the driving state estimating unit 32, but it would also be acceptable to apply a band-pass filter to values detected by the wheel speed sensors to extract the unsprung mass resonance component, or for the driving state estimating unit 32 to estimate the unsprung mass speed along with the sprung mass speed, and extract the unsprung mass resonance component.

(Configuration of Damping Force Control Unit)

Figure 17:
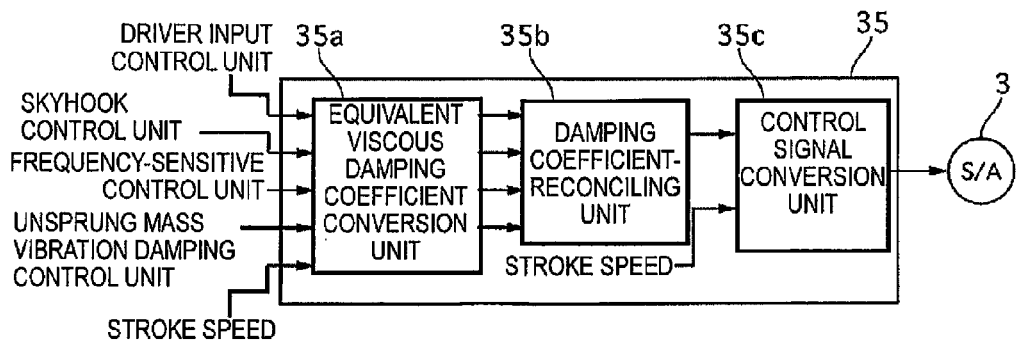
FIG. 17 is a control block diagram showing a control configuration for a damping force control unit of the first embodiment.

Next, the configuration of the damping force control unit 35 will be described. FIG. 17 is a control block diagram showing a control configuration for a damping force control unit of the first embodiment. The driver input damping force control amount output from the driver input control unit 31, the S/A orientation control amount output from the skyhook control unit 33$a$, the frequency-sensitive damping force control amount output from the frequency-sensitive control unit 33$b$, the unsprung mass vibration damping force control amount output from the unsprung mass vibration damping control unit 34, and the stroke speed calculated by the driving state estimating unit 32 are input into an equivalent viscous damping coefficient conversion unit 35a, which converts these values into an equivalent viscous damping coefficient.

Of the damping coefficients converted by the equivalent viscous damping coefficient conversion unit 35a (hereafter denoted respectively as a driver input damping coefficient k1, a S/A orientation damping coefficient k2, a frequency-sensitive damping coefficient k3, and a unsprung mass vibration damping coefficient k4), a damping coefficient reconciling unit 35b reconciles which damping coefficients are to be used as the basis for control, and outputs a final damping coefficient. A control signal conversion unit 35c converts a control signal (command current value) to be sent to the S/A 3, doing so based on the stroke speed and the damping coefficient reconciled by the damping coefficient-reconciling unit 35b, and outputs the signal to the S/A 3.

(Damping Coefficient-Reconciling Unit)

Next, the specifics of reconciliation performed by the damping coefficient reconciling unit 35b will be described. The vehicle control device of the first embodiment has four control modes. The first is a standard mode which envisions a state in which a suitable turning state may be obtained when driving on typical city streets or the like. The second is a sport mode which envisions a state in which a stable turning state may be obtained when aggressively driving along a winding road or the like. The third is a comfort mode which envisions a state in which priority is given to ride comfort, such as when setting off at low vehicle speed. The fourth is a highway mode which envisions a state of driving at high vehicle speeds on a freeway or the like, with numerous straight sections.

In the standard mode, control is carried out while giving priority to unsprung mass vibration damping control by the unsprung mass vibration damping control unit 34, while skyhook control is performed by the skyhook control unit 33a. In the sports mode, skyhook control by the skyhook control unit 33a and unsprung mass vibration damping control is by the unsprung mass vibration damping control unit 34 are carried out, while giving priority to driver input control by the driver input control unit 31. In the comfort mode, control is carried out while giving priority to unsprung mass vibration damping control by the unsprung mass vibration damping control unit 34, while frequency-sensitive control is performed by the frequency-sensitive control unit 33b. In the highway mode, control is carried out while adding a control amount for the unsprung mass vibration damping control by the unsprung mass vibration damping control unit 34, to the skyhook control performed by the skyhook control unit 33a, while also giving priority to the driver input control performed by the driver input control unit 31. Damping coefficient reconciliation in each of these modes will be described below.

(Reconciliation in Standard Mode)

Figure 18:
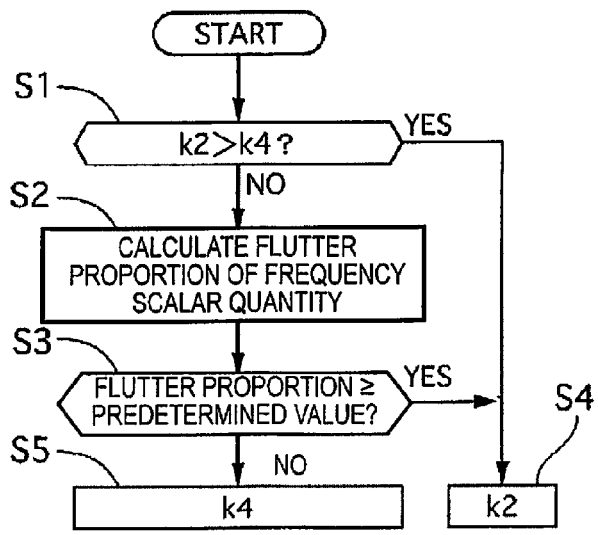
FIG. 18 is a flow chart of a damping coefficient reconciliation process performed during a standard mode in the first embodiment.

FIG. 18 is a flow chart showing a damping coefficient reconciliation process performed in the standard mode in the first embodiment.

In step S1, a determination is made as to whether the S/A orientation damping coefficient k2 is greater than the unsprung mass vibration damping coefficient k4, and, when this is the case, the process advances to step S4, in which k2 is set as the damping coefficient.

In step S2, a scalar quantity proportion for the flutter region is calculated based on scalar quantities of the float region, bounce region, and flutter region, described in the context of the frequency-sensitive control unit 33b.

In step S3, a determination is made as to whether the proportion of the flutter region is equal to or greater than a predetermined value, when this is the case, the process advances to step S4, in which the low value k2 is established as the damping coefficient, out of a concern that high-frequency vibration will degrade ride comfort. On the other hand, in cases in which the proportion of the flutter region is less than the predetermined value, there is no basis for concern that high-frequency vibration will degrade ride comfort, even if a high damping coefficient is established, and therefore the process advances to step S5, in which k4 is set as the coefficient.

In the standard mode, as discussed above, as a general rule, priority is given to unsprung mass vibration damping control, which minimizes resonance in the unsprung mass. However, when the damping force required for skyhook control is less than the damping force required for unsprung mass vibration damping control, and moreover the proportion of the flutter region is large, the damping force for skyhook control is established so as to avoid exacerbating the high-frequency vibration profile associated with meeting the requirements of unsprung mass vibration damping control. This allows an optimal damping profile to be obtained according to the driving state, thus avoiding high-frequency vibration-induced degradation of ride comfort, while simultaneously achieving a flat vehicle body feel.

(Reconciliation in Sport Mode)

Figure 19:
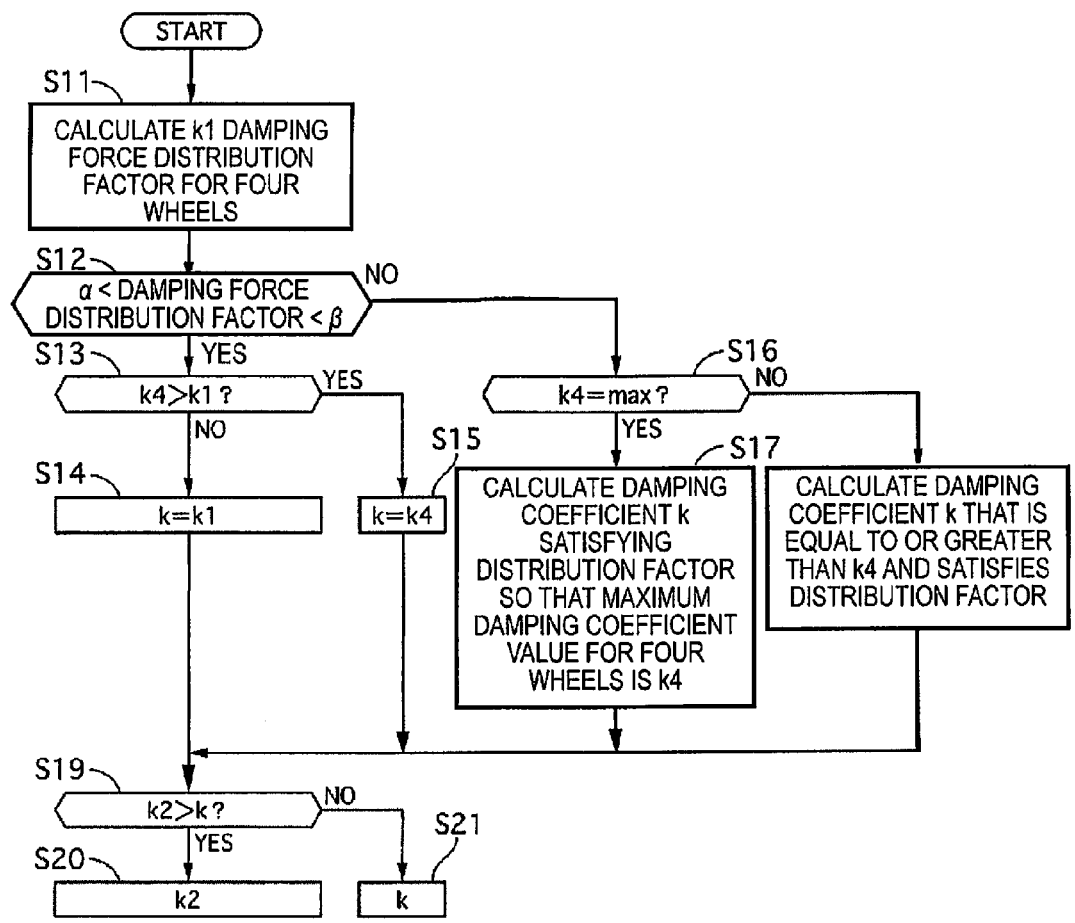
FIG. 19 is a flow chart of a damping coefficient reconciliation process performed during a sport mode in the first embodiment.

FIG. 19 is a flow chart showing a damping coefficient reconciliation process performed during the sport mode in the first embodiment.

In step S11, the damping force distribution factors for the four wheels are calculated based on the driver input damping coefficients k1 for the four wheels established through driver input control. Defining k1fr as the front right wheel driver input damping coefficient, k1fl as the front left wheel driver input damping coefficient, k1rr as the rear right wheel driver input damping coefficient, k1rl as the rear left wheel driver input damping coefficient, and xfr, xfl, xrr, and xrl as the damping force distribution factors for each of the wheels, distribution factors are calculated as follows:

$$xfr = k1fr/(k1fr + k1fl + k1rr + k1rl)$$

$$xfl = k1fl/(k1fr + k1fl + k1rr + k1rl)$$

$$xrr = k1rr/(k1fr + k1fl + k1rr + k1rl)$$

$$xrl = k1rl/(k1fr + k1fl + k1rr + k1rl)$$

In step S12, a determination is made as to whether a damping force distribution factor x is within a predetermined range (greater than α and less than β), and when this is the case, a determination that distribution substantially equal for all the wheels is made, and the process advances to step S13; but if even one factor is outside the predetermined range, the process advances to step S16.

In step S13, a determination is made as to whether the unsprung mass vibration damping coefficient k4 is greater than the driver input damping coefficient k1, and when this is the case, the process advances to step S15, in which k4 is set as a first damping coefficient k. On the other hand, when the unsprung mass vibration damping coefficient k4 is equal to or less than the driver input damping coefficient k1, the process advances to step S14, in which k1 is set as the first damping coefficient k.

In step S16, a determination is made as to whether the unsprung mass vibration damping coefficient k4 equals the maximum value max settable for the S/A 3; and when it is the case that it equals the maximum value max, the process advances to step S17, or if not the case, the process advances to step S18.

In step S17, a damping force coefficient such that the maximum value of the driver input damping coefficients k1 for the four wheels equals the unsprung mass vibration damping coefficient k4, and that satisfies a damping force distribution factor, is calculated as the first damping coefficient k. In other words, a value that increases the damping coefficient to maximum while satisfying the damping force distribution factor is calculated.

In step S18, a damping coefficient that satisfies the damping force distribution factor within a range in which the driver input damping coefficient k1 for each of the four wheels is equal to or greater than k4 is calculated. In other words, a value that satisfies the damping force distribution factor established through driver input control, and that satisfies requirements at unsprung mass vibration damping control end are met, is calculated.

In step S19, a determination is made as to whether the first damping coefficients k set in the abovementioned steps are less than the S/A orientation damping coefficient k2 established through skyhook control; in the case of being determined to be smaller, the damping coefficient required at skyhook control side is larger, and therefore the process advances to step S20, and k2 is set. On the other hand, if k is equal to or greater than k2, k is set and the process advances to step S21, and k is set.

In the sport mode, as discussed above, as a general rule, priority is given to unsprung mass vibration damping control, which minimizes resonance of the unsprung mass. However, because the damping force distribution factor required from the driver input control side is intimately related to vehicle body orientation, and in particular is profoundly related to change in the driver's line of sight due to the roll mode, utmost priority is given to ensuring the damping force distribution factor, rather than the damping coefficient required from the driver input control side as such. For movement that induces change in vehicle body orientation in a state in which the damping force distribution factor is maintained, stable vehicle body orientation can be preserved through selection of "select high" for skyhook control.

(Reconciliation in Comfort Mode)

Figure 20:
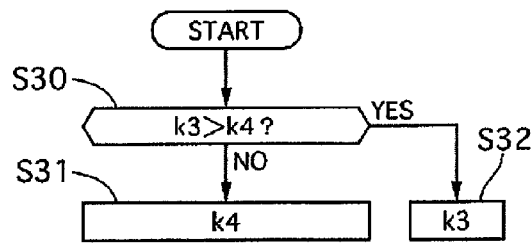
FIG. 20 is a flow chart of a damping coefficient reconciliation process performed during a comfort mode in the first embodiment.

FIG. 20 is a flow chart showing a damping coefficient reconciliation process performed during the comfort mode in the first embodiment.

In step S30, a determination is made as to whether the frequency-sensitive damping coefficient k3 is greater than the unsprung mass vibration damping coefficient k4, and, in the case of being determined to be greater, the process advances to step S32 in which the frequency-sensitive damping coefficient k3 is set. On the other hand, in the case of a determination that the frequency-sensitive damping coefficient k3 equal to or less than the unsprung mass vibration damping coefficient k4, the process advances to step S32 in which the unsprung mass vibration damping coefficient k4 is set.

In the comfort mode, as discussed above, basically, priority is given to unsprung mass resonance damping control to minimize resonance of the unsprung mass. Because in the first place frequency-sensitive control is performed as sprung mass vibration damping control, thereby establishing an optimal damping coefficient according to the road surface conditions, control to ensure ride comfort can be accomplished, and a sensation of insufficient ground contact due to rattling of the unsprung mass can be avoided through unsprung mass vibration damping control. In the comfort mode, as in the standard mode, it is acceptable for the damping coefficient to be switched according to the proportion of flutter in the frequency scalar quantity. This allows for a super comfort mode in which ride comfort is better ensured.

(Reconciliation in Highway Mode)

Figure 21:
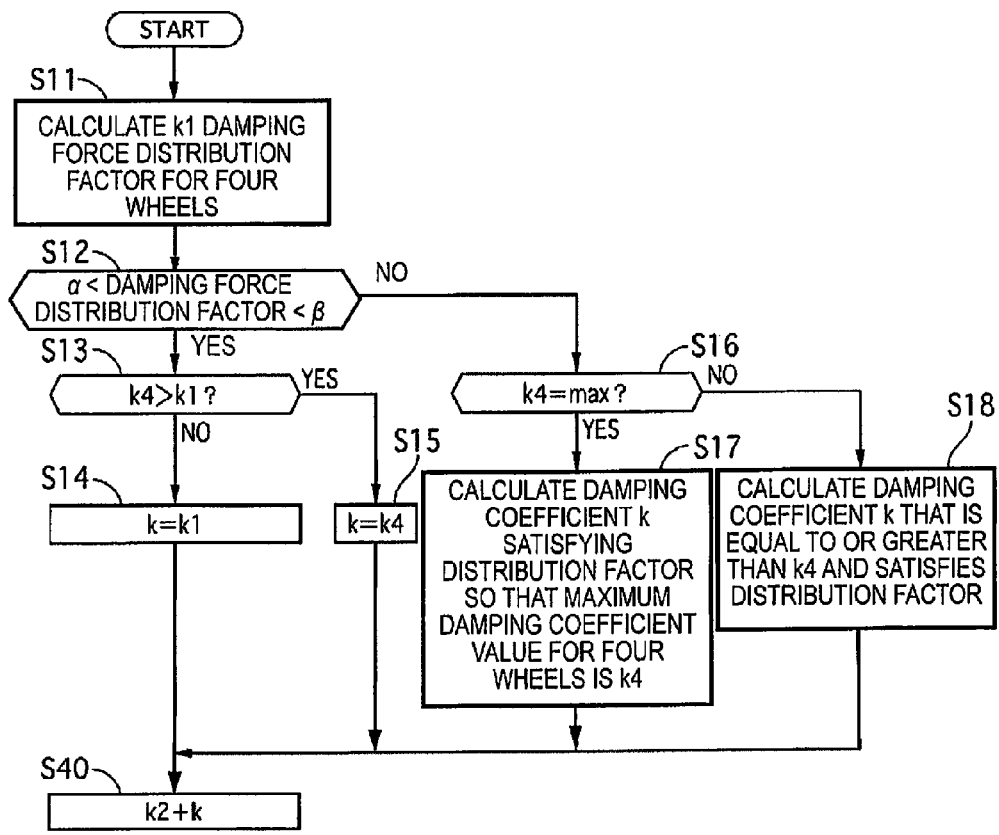
FIG. 21 is a flow chart of a damping coefficient reconciliation process performed during a highway mode in the first embodiment.

FIG. 21 is a flow chart showing a damping coefficient reconciliation process performed during the highway mode in the first embodiment. The reconciliation process from steps S11 to S18 is the same as in the sport mode, and therefore a description will be omitted.

In step S40, the S/A orientation damping coefficient k2 afforded by skyhook control is added to the reconciled first damping coefficient k afforded by the process up to step S18, and the coefficient is output.

Figure 22:
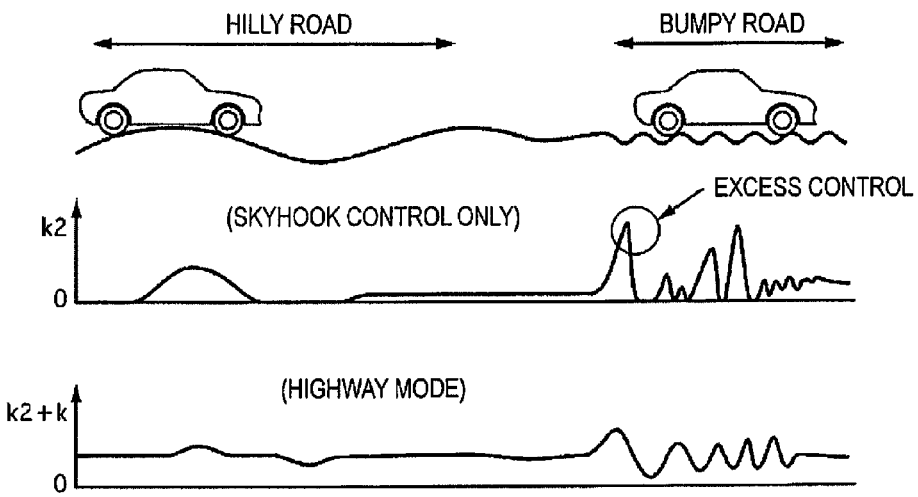
FIG. 22 is a time chart showing changes in damping coefficient when driving on a hilly road surface and a bumpy road surface.

In the highway mode, as discussed above, a value obtained by adding the S/A orientation damping coefficient k2 to the reconciled first damping coefficient k is used when reconciling the damping coefficient. This operation will now be described with reference to the drawings. FIG. 22 is a time chart showing change in the damping coefficient during driving on a hilly road surface and a bumpy road surface. For instance, when attempting to minimize motion giving rise to swaying movement of the vehicle body due to the effects of slight hill in the road surface when driving at high vehicle speed, if it is attempted to achieve this through skyhook control alone, it will be necessary to detect slight fluctuations in wheel speed, which requires establishing a comparatively high skyhook control gain. In such cases, swaying motion can be minimized, but when there are bumps or the like on the road surface, there is a risk that the control gain will be too great, resulting in excessively high control gain and excessive damping force control. This gives rise to concerns of degraded ride comfort or vehicle body orientation.

In contrast to this, because the first damping coefficient k is set constantly as in highway mode, a given level of damping force can be constantly ensured, and swaying motion of the vehicle body can be minimized, even when the damping coefficient produced through skyhook control is low. Additionally, because there is no need to boost the skyhook control gain, bumps in the road surface can be dealt with appropriately through ordinary control gain. Moreover, because skyhook control is performed in a state in which the damping coefficient k has been established, unlike in the case of a damping coefficient limit, operation of a damping coefficient reduction step is possible in the semi-active control region, ensuring stable vehicle orientation during high-speed driving.

(Mode Selection Process)

Figure 23:
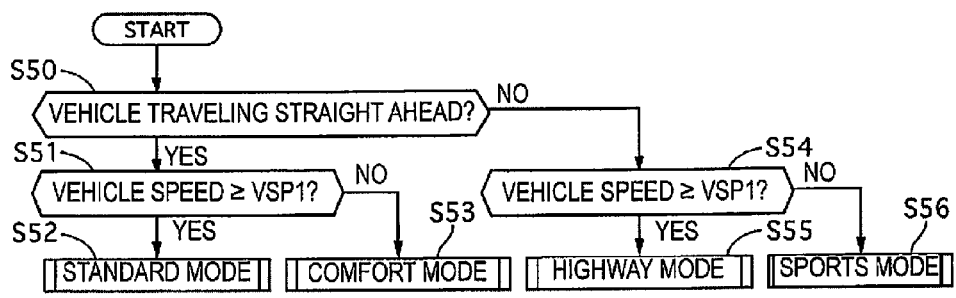
FIG. 23 is a flow chart of a driving state-based mode selection process performed by a damping coefficient-reconciling unit of the first embodiment.

Next, a mode selection process for selecting the aforementioned driving modes will be described. FIG. 23 is a flow chart showing a driving state-based mode selection process performed by the damping coefficient-reconciling unit of the first embodiment.

In step S50, based on the value from the steering angle sensor 7, a determination is made as to whether a state of driving straight ahead exists, and if a state of driving straight ahead is determined to exist, the process advances to step S51, whereas in the case of a determination that a state of turning exists, the process advances to step S54.

In step S51, based on the value from the vehicle speed sensor 8, a determination is made as to whether a predetermined vehicle speed VSP1 indicating a state of high vehicle speed has been reached or exceeded, and, in the case of a determination that VSP1 has been reached or exceeded, the process advances to step S52 and standard mode is selected. On the other hand, in the case of a determination that the speed is less than VSP1, the process advances to step S53, and comfort mode is selected.

In step S54, based on the value from the vehicle speed sensor 8, a determination is made as to whether a predetermined vehicle speed VSP1 indicating a state of high vehicle speed has been reached or exceeded, and, in the case of a determination that VSP1 has been reached or exceeded, the process advances to step S55, and highway mode is selected. On the other hand, in the case of a determination that the speed is less than VSP1, the process advances to step S56, and sport mode is selected.

That is, standard mode is selected when driving at a high vehicle speed when driving straight ahead, thereby making it possible to stabilize the vehicle body orientation via skyhook control, ensure ride comfort by minimizing high-frequency vibration-induced bouncing or fluttering, and minimizing resonance in the unsprung mass. Selecting comfort mode when driving at low speeds makes it possible to minimize resonance in the unsprung mass while minimizing the transmission of vibration such as bouncing or fluttering to passengers.

Meanwhile, highway mode is selected when driving at a high vehicle speed in a state of turning, thereby performing control using a value to which a damping coefficient has been added; thus, high damping force is yielded as a rule. It is thus possible to minimize unsprung mass resonance while actively ensuring the unsprung mass resonance during turning via driver input control, even when traveling at a high vehicle speed. Selecting sports mode when driving at a low vehicle speed allows unsprung mass resonance to be minimized while actively ensuring the vehicle body orientation during turning via driver input control and performing skyhook control as appropriate, thereby allowing for driving with a stable vehicle orientation.

In the first embodiment, an example of a mode selection process in which the driving state is detected and the mode is automatically switched has been presented, but it is also possible to provide a mode switch or the like that can be operated by a driver to select the driving mode. This yields ride comfort and turning performance matching the driver's desired driving state.

(Deterioration in Accuracy of Estimation)

Deterioration in accuracy of estimation will be described next. As mentioned above, in the first embodiment, in each of the driving state estimating units 100, 200, 32, a stroke speed, a bounce rate, a roll rate, and a pitch rate for use in skyhook control by the sprung mass damping control unit 101a or 33, or by the skyhook control unit 201, are estimated for each wheel, doing so based on wheel speed detected by the wheel speed sensors 5. However, there may be envisioned scenarios in which, during estimation of stroke speed or the sprung mass state from wheel speed, the accuracy of estimation deteriorates for any of various reasons. For example, in the case of driving along a road having a low μ value, slip is prone to occur, and it is difficult to ascertain whether or not fluctuations in wheel speed occurring in association with this slip are due to irregularities on the road surface. Moreover, in the case of a road having a low μ value, the amount of fluctuation in wheel speed attributed to irregularities on the road surface or changes in the sprung mass state tends to be small, making it difficult to differentiate from other types of noise. Moreover, because fluctuations in driving/braking force also give rise to fluctuations in wheel speed, it can be difficult to distinguish between these fluctuations, and sprung mass state or stroke speed. Additionally, fluctuations in wheel speed can arise from lateral acceleration or the yaw rate in non-linear regions, such as the friction circle limit of the tires, and can be difficult to distinguish from other types of noise. When the accuracy of estimation deteriorates, there may be instances in which, for example, the damping force is set to a low level despite the need to be set to a high level, making it difficult to stabilize the sprung mass state.

This lowering of estimation accuracy merely poses a problem in terms of precision, and because it does not involve any sensor malfunction or actuator malfunction, it is desirable for control to continue on with the range it is possible to do so. Accordingly, in the first embodiment, the estimation accuracy deterioration detection unit 4a has been provided to detect cases of deterioration in the estimation accuracy, and in cases of deterioration in the estimation accuracy, control continues to the extent possible, while ensuring performance that is at least as good or better than an ordinary vehicle in which vehicle vibration damping control is not performed, so as to stabilize the sprung mass behavior associated with the deterioration in the estimation accuracy.

(Estimation Accuracy Deterioration Detection Processes)

Figure 24:
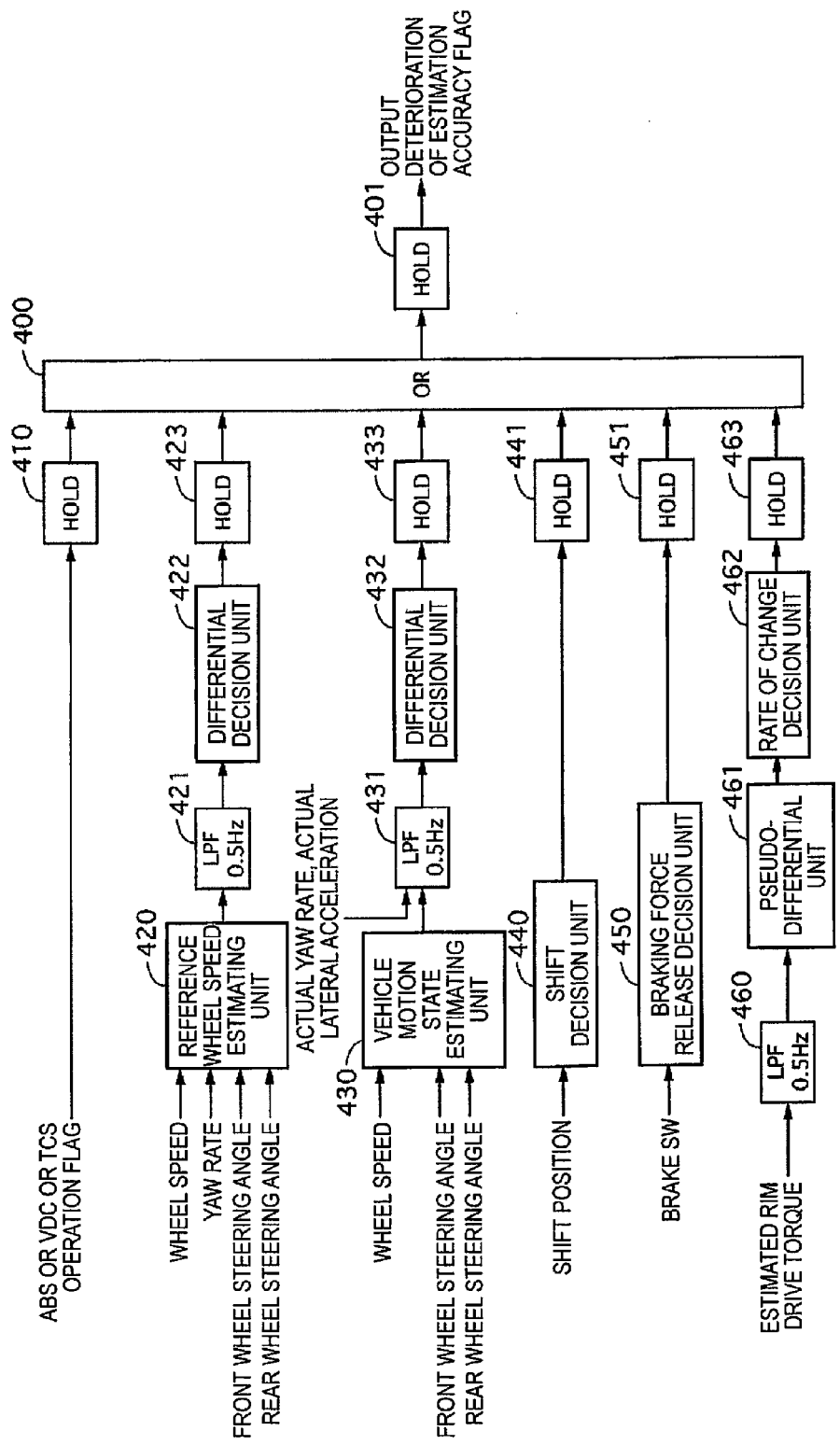
FIG. 24 is a control block diagram showing a control configuration of the vehicle control device according to the first embodiment.

FIG. 24 is a control block diagram showing estimation accuracy deterioration detection processes of the first embodiment. In the estimation accuracy deterioration detection unit 4a, multiple deterioration in the estimation accuracy detection processes are executed based on various kinds of signals, and in a signal reception unit 400, when deterioration in accuracy in even one of the respective processes has been detected, a deteriorated-accuracy signal is output to a deterioration in accuracy hold unit 401. In the deterioration in accuracy hold unit 401, during the interval that the deteriorated-accuracy signal is received, and for a predetermined time subsequent to cutoff of the deteriorated-accuracy signal (in the case of the first embodiment, a one-second interval), a deterioration in accuracy flag is set continuously to "ON." In so doing, frequent switching of the deterioration in accuracy flag can be minimized, while avoiding control states based on erroneous state estimation values. The respective estimation accuracy deterioration detection processes will be described in sequence below.

(Detection Via ABS, VDC, or TCS Flags)

The vehicle of the first embodiment has an anti-skid brake control unit (hereinafter termed an ABS control unit) for detecting the state of slip of the wheels during braking, and performing pressure regulation control to bring the slip rate to a predetermined value or below; a vehicle dynamics control unit (hereinafter termed a VDC control unit) for controlling the brake fluid pressure of prescribed wheels, to bring a turning state of the vehicle (for example, the yaw rate) to a target turning state; and a traction control unit (hereinafter termed a TCS control unit) for performing brake pressure boost control or engine torque-down control, in order to minimize drive slip when the vehicle begins to move, or the like. In cases in which these control units have operated, the wheel speed fluctuations of the wheels will be affected thereby, thereby posing a risk of deterioration in the estimation accuracy. Therefore, in cases in which ABS flag, a VDC flag, or a TCS flag, which indicate that these controls have operated, has gone "ON," a flag-ON signal is output to a brake control flag hold unit 410. In the brake control flag hold unit 410, a deteriorated-estimation accuracy signal is output during the interval in which the flag-ON signal is received. The deteriorated-accuracy signal continues to be output for a predetermined duration (in the case of the first embodiment, a five-second interval) following fall of the flag-ON signal. In so doing, a steady deteriorated-estimation accuracy signal can be output, even in cases such that the brake control flag repeatedly goes ON/OFF.

(Detection Based on Reference Vehicle Body Speed)

Detection based on a reference vehicle body speed shall be described next. In the first embodiment, in the first to third driving state estimating units 100, 200, 32, when stroke speed is estimated from wheel speed data, a reference wheel speed is calculated in order to detect a component that fluctuates in association with stroke of the S/A 3. The purpose of doing so is to extract differentials between the reference wheel speed and the wheel speed sensor values, as a component of fluctuation in association with stroke. While this reference wheel speed can ensure precise stroke speed estimation under conditions in which slip or the like is not occurring, when slip occurs, it becomes difficult to distinguish whether fluctuations are those associated with stroke, or wheel speed fluctuations associated with slip. Within a frequency region including the stroke speed component, the sprung mass speed component, and the like, it is not possible to differentiate from noise and the like, and therefore the accuracy of the signal cannot be guaranteed. Accordingly, a low-pass filter of a frequency to the low-frequency end (in the first embodiment, 0.5 Hz) from the vibration frequencies arising due to stroke speed, sprung mass speed, and the like is applied to the reference wheel speed, and in cases in which, subsequent to application of this low-pass filter, variability of the reference wheel speed among the wheels is observed, it is detected that wheel speed fluctuations are due to slip, and that estimation accuracy has deteriorated.

In a reference wheel speed estimating unit 420, as described in the context of the reference wheel speed calculating unit of FIG. 6, a first wheel speed V0 to serve as a reference wheel speed for each of the wheels is calculated based on the vehicle body plan view model. Here, ω(rad/s) is the wheel speed sensor detected by the wheel speed sensor 5, δf (rad) is the front wheel actual steering angle detected by the steering angle sensor 7, δr (rad) is the rear wheel actual steering angle, Vx is the vehicle body lateral speed, γ (rad/s) is the yaw rate detected by the integrated sensor 6, V (m/s) is the vehicle body speed estimated from the calculated reference wheel speed ω0, VFL, VFR, VRL, and VRR are the reference wheel speeds to be calculated, Tf is the front wheel tread, Tr is the rear wheel tread, Lf is the distance from the position of the vehicle center of gravity to the front wheels, and Lr is the distance from the position of the vehicle center of gravity to the rear wheel. The vehicle body plan view model is expressed as follows, using the symbols described above.

$$VFL=(V-Tf/2\cdot\gamma)\cos\delta f+(Vx+Lf\cdot\gamma)\sin\delta f$$

$$VFR=(V+Tf/2\cdot\gamma)\cos\delta f+(Vx+Lf\cdot\gamma)\sin\delta f$$

$$VRL=(V-Tr/2\cdot\gamma)\cos\delta r+(Vx-Lr\cdot\gamma)\sin\delta r$$

$$VRR=(V+Tr/2\cdot\gamma)\cos\delta r+(Vx-Lr\cdot\gamma)\sin\delta r \quad \text{(Formula 1)}$$

Assuming normal driving in which no lateral sliding of the vehicle, a "0" may be input for the vehicle body lateral speed Vx. When rewritten with values based on V in the respective formulas, the expressions are as follows. When rewritten in this manner, V is denoted as V0FL, V0FR, V0RL, and V0RR (equivalent to first wheel speeds) as values corresponding to the respective wheels.

$$V0FL=\{VFL-Lf\cdot\gamma\sin\delta f\}/\cos\delta f+Tf/2\cdot\gamma$$

$$V0FR=\{VFR-Lf\cdot\gamma\sin\delta f\}/\cos\delta f-Tf/2\cdot\gamma$$

$$V0RL=\{VRL+Lr\cdot\gamma\sin\delta r\}/\cos\delta r+Tr/2\cdot\gamma$$

$$V0RR=\{VRR+Lf\cdot\gamma\sin\delta f\}/\cos\delta R-Tr/2\cdot\gamma \quad \text{(Formula 2)}$$

A reference wheel speed for each wheel is calculated based on these relational expressions.

Next, in a low-pass filter 421, filtering at 0.5 Hz, which represents a region to the low-frequency end from a frequency region including stroke speed and sprung mass speed is performed on the reference wheel speed V0FL, FR, RL, RR calculated for each wheel, and a stationary component is extracted. In a differential decision unit 422, the following respective values are calculated.

Roll Component (Left-Right Differential)

$$df1=VOFL-VOFR$$

$$df1=VORL-VORR$$

Pitch Component (Front-Back Differential)

$$df3=VOFL-VORL$$

$$df4=VOFR-VORR$$

Warp Component (Diagonal Differential)

$$df5=VOFL-VORR$$

$$df6=VOFR-VORL$$

Basically, in the case of calculating these differentials using values obtained subsequent to passage through the low-pass filter 421, as long as slip is not occurring, the reference wheel speeds of all of the wheels are equal, and therefore the differentials will be "0" or exceedingly small values. However, when slip arises, change in the stationary component arises, and therefore in cases in which any differential df1-df5 of a value obtained subsequent to passage through the low-pass filter 421 is equal to or greater than a pre-established prescribed value dfthi, a deteriorated-estimation accuracy signal is output to a reference wheel speed hold unit 423. Moreover, in order to prevent hunting during this decision, output of the deteriorated-estimation accuracy signal is halted in cases in which the differential is equal to or less than value obtained by multiplying the prescribed value dfthi by 0.8. In the reference wheel speed hold unit 423, for the duration of the time that the deteriorated-estimation accuracy signal is being received, and for a prescribed duration following completion of reception (in the case of the first embodiment, a two-second interval), the deteriorated-accuracy signal is output continuously. In so doing, a steady deteriorated-estimation accuracy signal can be output, even in cases in which the deteriorated-estimation accuracy signal of the differential decision unit 422 repeatedly goes ON/OFF.

(Detection Based on Plan View Model)

Next, detection based on a plan view model will be described. As described previously in FIG. 14, when roll rate minimization control is performed in driver input control, a plan view model is established, and lateral acceleration Yg is estimated.

$$Yg=(VSP^2/(1+A\cdot VSP^2))\cdot\gamma f$$

Here, A is a prescribed value. The roll rate is estimated from the lateral acceleration Yg estimated based on this relationship. At this time, under conditions such that the estimation accuracy of stroke speed deteriorates due to the occurrence of slip or the like, the estimated value of the aforementioned lateral acceleration will diverge from the actual value. Accordingly, a low-pass filter of a frequency (in the first embodiment, 0.5 to the low-frequency end from the vibration frequencies produced by stroke speed, sprung mass speed, or the like is applied to the estimated lateral acceleration, and when the lateral acceleration subsequent to application of this low-pass filter diverges from the actual lateral acceleration detected by the lateral acceleration sensor, it is detected that wheel speed fluctuations are due to slip, and that estimation accuracy has deteriorated.

In a vehicle motion state estimating unit 430, the vehicle speed VSP detected by the wheel speed sensor 8 and the steering angle detected by the steering angle sensor 7 are read in, and the lateral acceleration is estimated based on a plan view model. In like fashion, the yaw rate is estimated based on a plan view model. With regard to estimation of the yaw rate, when, for example, the yaw rate is denoted as γ, it may be calculated from the relationship Yg=VSP·γ, or estimated based on (Formula 1) or (Formula 2).

Next, in a low-pass filter 431, filtering by a low-pass filter of a frequency of 0.5 Hz, which represents a region to the low-frequency end from a frequency region including the stroke speed and sprung mass speed, is performed on the estimated lateral acceleration, the estimated yaw rate, and the sensor value from the integrated sensor 6, and a stationary component is extracted. Then, in a differential decision unit 432, the differentials of the respective estimated value and sensor values are calculated.

$dfyrss$=estimated yaw rate−actual yaw rate $dflgss$=estimated lateral acceleration−actual lateral acceleration Basically, in cases in which these differentials dfyrss, dflgss have been calculated using values obtained subsequent to passage through the low-pass filter 431, when slip or the like has not arisen, the estimated values and the sensor values will be approximately equal, and the and therefore the differentials will be "0" or exceedingly small values. However, when slip arises, change in the stationary component arises, and therefore in cases in which any differential dfyrss, dflgss of a value obtained subsequent to passage through the low-pass filter 431 is equal to or greater than a pre-established prescribed value dfthi, a deteriorated-estimation accuracy signal is output to a plan view model hold unit 433. Moreover, in order to prevent hunting during this decision, output of the deteriorated-estimation accuracy signal is halted in cases in which the differential is equal to or less than value obtained by multiplying the prescribed value dfthi by 0.8. In the plan view model hold unit 433, for the duration of the time that the deteriorated-estimation accuracy signal is being received, and for a prescribed duration following completion of reception (in the case of the first embodiment, a two-second interval), the deteriorated-accuracy signal is output continuously. In so doing, a steady deteriorated-estimation accuracy signal can be output, even in cases in which the deteriorated-estimation accuracy signal of the differential decision unit 432 repeatedly goes ON/OFF.

(Detection Based on Shift Position)

Next, detection based on shift position will be described. In a case in which, for example, the reverse range has been selected, the direction of rotation of the wheels will be the opposite direction from that during forward advance, and change associated with wheel speed fluctuations will also differ from that during forward advance. In a case in which the parking range has been selected, because the vehicle is at a stop, there is no need to estimate the stroke speed, and estimation itself is difficult. Therefore, in a shift decision unit 440, when the shift signal indicates either the reverse range or the parking range, a deteriorated-accuracy signal is output continuously to a shift hold unit 441. From the standpoint of preventing hunting in the shift hold unit 441 in association with shift operations, the deteriorated-accuracy signal is output continuously for a prescribed duration (in the first embodiment, a one-second interval) following completion of reception of the deteriorated-estimation accuracy signal.

(Detection Based on Brake Switch)

Next, detection based on the brake switch will be described. When the driver operates the brake pedal to generate braking force, followed by an operation of releasing the brake pedal, torque fluctuations occurring during release of braking act as impulse input. Because front-back vibration is excited by this impulse input, causing the wheel speed to fluctuate, the estimation accuracy of stroke speed and sprung mass state deteriorates. Accordingly, a braking force release decision unit 450 decides whether or not the brake switch has switched from ON to OFF, and in the event of a decision that it has switched, outputs a deteriorated-accuracy signal to a brake switch hold unit 451. The deteriorated-accuracy signal is output continuously for a prescribed duration (in the first embodiment, a one-second interval) following the point in time that the brake switch switched OFF.

(Detection Based on Wheel Rim Drive Torque)

Detection based on wheel rim drive torque will be described next. When a sudden change in torque occurs due to sudden acceleration or shifting, changes in torque of the drive wheels, specifically, changes in the wheel rim drive torque, arise, causing the wheel speed to fluctuate. Therefore, in cases in which a change in the wheel rim drive torque, equal to or greater than a prescribed level, has occurred, it can be decided that estimation accuracy has deteriorated. Estimation of wheel rim drive torque during acceleration can be made based on information including the effective torque of the engine, the engine rpm, the rpm of the turbine, the rpm of the automatic transmission output shaft, and the shift position; more specifically, it can be represented by the following formula.

$T_w = Te \cdot R_{TRQCVT} \cdot R_{AT} \cdot R_{FINAL} \cdot \eta_{TOTAL}$

Here, $T_w$ denotes the wheel rim drive torque, Te the engine torque, $R_{TRQCVT}$ the torque converter torque ratio, $R_{AT}$ the gear ratio of the automatic transmission, $R_{FINAL}$ the final gear ratio, and it $\eta_{TOTAL}$ the drive system efficiency.

The wheel rim drive torque likewise fluctuates during braking as well. In this case, because the braking force is proportional to the wheel cylinder pressure (in the case of normal braking in which control such as ABS is not performed, essentially the master cylinder pressure), the braking force on each wheel is estimated by multiplying a gain by the master cylinder pressure.

When the wheel rim drive torque (or wheel rim braking torque) is estimated in the manner outlined above, filtering by the 0.5 Hz low-pass filter, which represents a region to the low-frequency end from a frequency region including stroke speed and sprung mass speed is performed on the wheel rim drive torque by a low-pass filter 460, and a stationary component is extracted. A pseudo-differential unit 461 then calculates, through differentiation, a rate of change of the wheel rim drive torque. In a rate of change decision unit 462, when the calculated rate of change of wheel rim drive torque is equal to or greater than a pre-established prescribed value dfthi, a deteriorated-estimation accuracy signal is output to a wheel rim drive torque hold unit 463. Moreover, in order to prevent hunting during this decision, output of the deteriorated-estimation accuracy signal is halted in cases in which the differential is equal to or less than value obtained by multiplying the prescribed value dfthi by 0.8. In the wheel rim drive torque speed hold unit 463, for the time interval that the deteriorated-estimation accuracy signal is being received, and for a prescribed interval following completion of reception (in the case of the first embodiment, a one-second interval), the deteriorated-accuracy signal is output continuously. In so doing, a steady deteriorated-estimation accuracy signal can be output, even in cases in which the deteriorated-estimation accuracy signal of the rate of change decision unit 462 repeatedly goes ON/OFF.

When, in the course of performing the above detection processes, deterioration in accuracy is detected in any one of these, the deteriorated-estimation accuracy flag goes "ON," and a control process appropriate at times of deterioration in accuracy is executed. The control process at times of deterioration in accuracy is described below.

(Control Process at Times of Deterioration in Accuracy)

In cases in which the deteriorated-estimation accuracy flag is "ON," specifically, when deterioration in accuracy of estimation of the stroke speed is detected, the deterioration estimation accuracy detected control unit 5a outputs a "zero" as the engine orientation control amount to the engine control unit 102. Additionally, in cases in which the deteriorated-estimation accuracy flag is "ON," the deterioration estimation accuracy detected control unit 5a outputs a "zero" as the brake orientation control amount to the brake control unit 202. At this time, in the brake control unit 202, the brake orientation control amount is gradually lowered in such a way that the brake orientation control amount is lowered smoothly to zero over a fixed transition interval (for example, a one-second interval).

When brake pitch control for the purpose of holding the sprung mass pitch speed to a low level is suddenly halted, the pitch speed, which up to this point was held to a low level, suddenly increases, which can result in discomfort to the driver, as well as posing the risk of increased pitch behavior, or loss of ground contact load of the tires, leading to disturbances in vehicle behavior. By gradually lowering the braking torque control amount in the manner discussed above, sudden increases in the pitch speed can be minimized, and therefore discomfort to the driver can be reduced, and disturbances in vehicle behavior minimized.

In the manner indicated above, at times that deterioration of estimation accuracy of the stroke speed is detected, sprung mass vibration damping control by the engine 1 and the brakes 20 is suspended. In the first embodiment, the stroke speed is estimated from fluctuations of wheel speed in a prescribed frequency range, and sprung mass behavior control using the engine 1 and the brakes 20 is carried out according to the stroke speed; therefore, under conditions of deterioration in accuracy of estimation of the stroke speed, state estimation becomes difficult, and disturbances in sprung mass behavior due to degraded controllability are a concern. Therefore, in such cases, by suspending sprung mass behavior control by the engine 1 and the brakes 20, disturbances in vehicle body orientation associated with deterioration of estimation accuracy can be minimized, and stable vehicle body orientation can be maintained.

Figure 25:
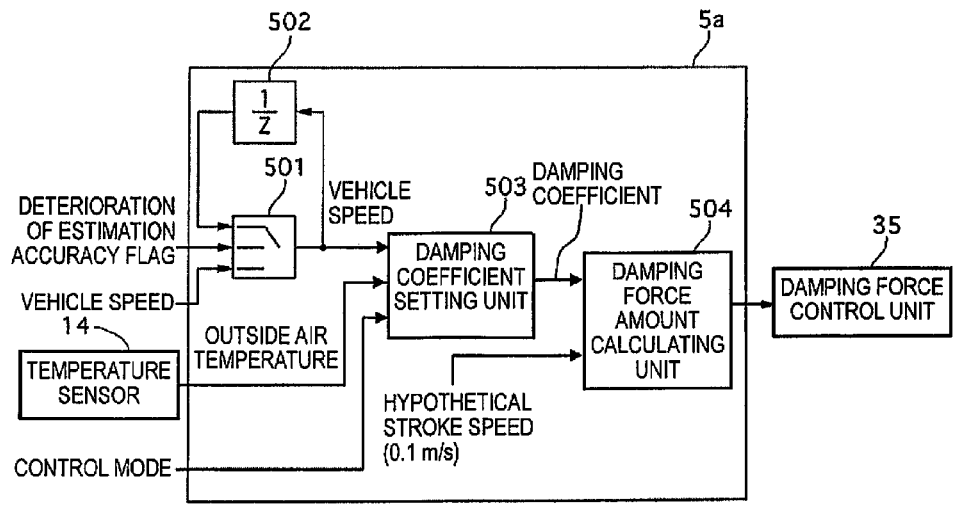
FIG. 25 is a control block diagram showing a configuration of a deterioration estimation accuracy detected control unit in the first embodiment.

In cases in which the deteriorated-estimation accuracy flag is "ON," the deterioration estimation accuracy detected control unit 5a outputs deteriorated-estimation accuracy-specific control signal (command current value) to the damping force control unit 35. FIG. 25 is a control block diagram showing a configuration of the deterioration estimation accuracy detected control unit 5a in the first embodiment. A vehicle speed calculating unit 501 inputs the deteriorated-estimation accuracy flag, the vehicle speed VSP detected by the vehicle speed sensor 8, and the value of vehicle speed VSP observed in the previous one sampling cycle (one clock). In a case in which the deteriorated-estimation accuracy flag is "OFF," the vehicle speed calculating unit 501 outputs to a delay element 502 the vehicle speed VSP detected by the vehicle speed sensor 8; and in a case in which the deteriorated-estimation accuracy flag has gone "ON," for a time interval until the flag goes "OFF," outputs to a damping coefficient setting unit 503 the vehicle speed observed in the previous one sampling cycle, specifically, the vehicle speed observed just prior to when deterioration of estimation accuracy of the stroke speed was detected. The delay element 502 delays the signal by one clock cycle. The damping coefficient setting unit 503 inputs the vehicle speed observed just prior to when deterioration of estimation accuracy of the stroke speed was detected, the outside air temperature detected by the temperature sensor 14, and the current driving mode, and outputs a deterioration estimation accuracy damping coefficient k5. The method for establishing the damping coefficient k will be discussed below. In a damping force control amount calculating unit 504, a control signal for the S/A 3 is calculated based on the damping coefficient k5 and a predetermined hypothetical stroke speed. Here, the hypothetical stroke speed is a fixed value representing a stroke speed such that the damping force of the S/A 3 is comparable to the damping force of conventional shock absorbers, for example, 0.1 m/s.

Figure 26:
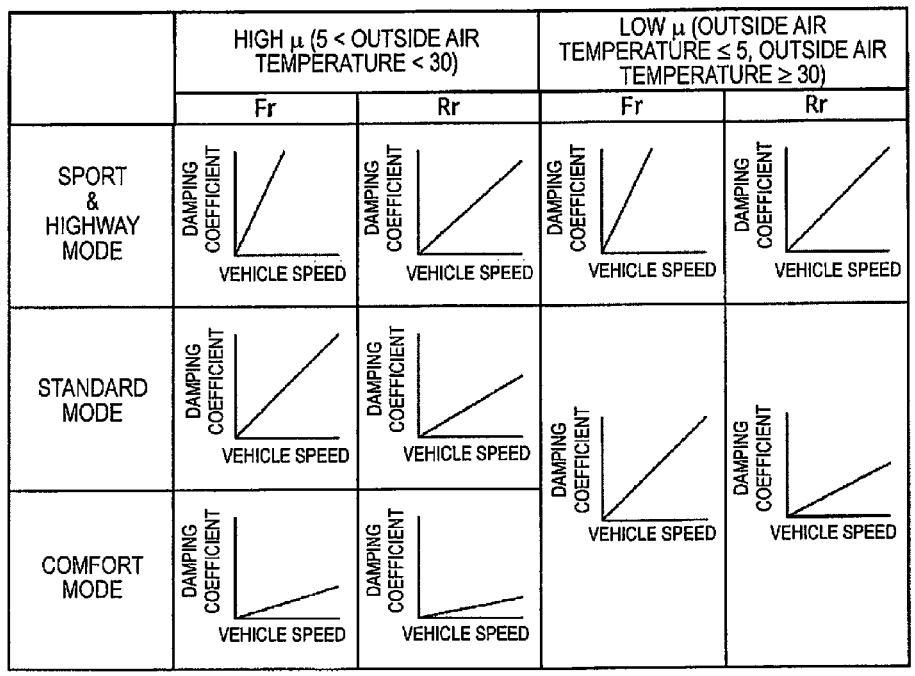
FIG. 26 is a descriptive diagram showing a method of setting a deterioration estimation accuracy damping coefficient, in the damping coefficient setting unit of the first embodiment.

FIG. 26 is a descriptive diagram showing a method of setting a deterioration estimation accuracy damping coefficient, in the damping coefficient setting unit of the first embodiment. The damping coefficient k5 is basically a value proportional to the vehicle speed (the vehicle speed observed just prior to when deterioration of estimation accuracy of the stroke speed was detected), and has a profile such that, for a given vehicle speed, the damping coefficient for the front wheel side Fr is higher than the damping coefficient for the rear wheel side Rr. The value damping coefficient k5 also accords with the control mode. In specific terms, the value is highest in the sport mode and the highway mode, and lowest in the comfort mode. In the standard mode, the value is an intermediate between the sport mode (the highway mode) and the comfort mode. The damping coefficient k5 in the sport mode and the highway mode is a damping coefficient at the upper limit of the level at which vibration in the bounce region (3-6 Hz) is not transmitted to passengers. The damping coefficient setting unit 503 is provided with a friction circle estimating unit 503a. The friction circle estimating unit 503a, based on the outside air temperature, estimates whether or not the size of the friction circle of each tire is equal to or less than a prescribed value. In cases in which the outside air temperature is within a prescribed range (for example, 5° C.<outside air temperature<30° C.), the friction circle estimating unit 503a estimates the size of the friction circle of each tire to be greater than the prescribed value, whereas in cases in which the temperature is outside the prescribed range (for example, outside air ≤5° C. or outside air temperature≥30° C. or above), the friction circle estimating unit 503a estimates the size to be equal to or less than the prescribed value. In cases in which the size of the friction circle is greater than the prescribed value, a state of a high friction coefficient µ between the tires and road surface (a high µ state) can be identified, and in cases in which it is equal to or less than the prescribed value, a state of a low friction coefficient µ (a low µ state) can be identified. During driving in the comfort mode, the damping coefficient setting unit 503, in cases in which the size of the friction circle of each tire is estimated to be greater equal to or less than the prescribed value, will set the damping coefficient to a higher value (the same damping coefficient as in the standard mode) than the damping coefficient in cases in which the size is estimated to be greater than the prescribed value.

In the manner indicated above, at times that deterioration of estimation accuracy of the stroke speed is detected, vehicle speed-sensitive control in which the damping force of the S/A 3 is set to a fixed damping force according to the control mode is employed. The reason is that, at times of deterioration of estimation accuracy, despite the fact that a failure of a sensor signal or actuator driving has not occurred, state estimation is difficult nevertheless, and therefore control in which stability is assigned greater weight, relative to ordinary times when estimation accuracy has not deteriorated, is necessary. In vehicle speed-sensitive control, a fixed damping coefficient is determined from the vehicle speed observed just prior to when deterioration of estimation accuracy was detected, and as such is not dependent upon a stroke speed which is highly likely to have been estimated erroneously, whereby, through a transition to a stable control state from an unstable control state dependent upon stroke speed, lowered steering stability and ride comfort, as well as destabilization of vehicle behavior, can be minimized.

In vehicle speed-sensitive control, the damping coefficient k5 is established based on the vehicle speed observed just prior to when deterioration of estimation accuracy was detected, and a fixed damping force is determined based on the damping coefficient k5 and a prescribed hypothetical stroke speed (0.1 m/s). At this time, because the damping coefficient k5 is set to a value that is higher in association with higher vehicle speed observed just prior to when deterioration of estimation accuracy was detected, optimal damping force matched to the vehicle speed is obtained. That is, it is possible both to ensure ride comfort in a low speed zone, and to ensure stable maneuvering in a high speed zone.

Moreover, because the damping coefficient k5 assumes successively higher values in the sport mode/highway mode, the standard mode, and the comfort mode, in that order, a fixed damping force that is matched to the control mode can be established. That is, in the sport mode and highway mode, the damping force is high, giving priority to stable maneuvering; in the comfort mode, the damping force is low, giving priority to ride comfort; and in the standard mode, the damping force is intermediate, so that both stable maneuvering and ride comfort are achieved. Moreover, in each of the control modes, the fixed damping force of the front wheels exceeds the fixed damping force of the rear wheels, whereby nose diving can be minimized, an understeering tendency can be adopted as the steering tendency, and stable turning behavior can be ensured.

As shown above, during driving in the comfort mode, in the event that deterioration of estimation accuracy of stroke speed is detected, and moreover the outside air temperature is outside a prescribed range (outside air temperature≤5° C. to outside air temperature≥30° C. or above), the fixed damping force is set to a higher level than in cases in which the outside air temperature is outside the prescribed range (outside air temperature ≤5° C. or outside air temperature ≥30° C. or above). In other words, in the case of a low μ state during driving in the comfort mode, the fixed damping force is set to a higher level than in cases of a high μ state. In cases in which the outside air temperature is 5° C. or below, freezing of the road surface can be predicted, and therefore the likelihood of a low μ state is high. In cases in which the outside air temperature is 30° C. or above, particularly with studless tires, grip performance deteriorates, and therefore the likelihood of a low μ state is high.

In cases in which nose diving occurs due to deterioration of estimation accuracy, leading to a change to a direction of reduced ground contact load by the tires of the rear wheels, in a high μ state in which the threshold limit of the gripping force of the tires is high (the friction circle is large), the likelihood of exceeding the threshold limit of the gripping force of the tires during turning is low; however, in a low μ a state in which the threshold limit of the gripping force of the tires is low (the friction circle is small), there is a high likelihood of exceeding the threshold limit of the gripping force of the tires during turning. Particularly in the comfort mode, in which ride comfort has priority, the fixed damping force reaches its lowest value as compared with the other three modes, and therefore the aforedescribed problem becomes quite noticeable. Therefore, in instances of deterioration of estimation accuracy of stroke speed occurring in a low μ state during driving in the comfort mode, there is a risk of lowered stability of turning behavior, such as induced reverse steer or the like. Here, reverse steer refers to a change in the steering tendency during turning, from an understeer tendency to an oversteer tendency. For this reason, according to the first embodiment, in the comfort mode, the fixed damping force in the low p. state is set to a higher level than the fixed damping force in the high μ, state. In so doing, the reduction in the ground contact load of the tires of the rear wheels can be minimized, and the occurrence of nose diving suppressed, thereby minimizing the proclivity for the steering tendency to become an oversteer tendency, and ensuring stable turning behavior.

On the other hand, in the sport mode, the highway mode, and the standard mode, the fixed damping force in the low μ state is set to the same value as the fixed damping force in the high μ state. The reason is that because the fixed damping force in the aforedescribed three modes is greater than in the comfort mode, the likelihood of exceeding the threshold limit of the gripping force of the tires during turning is low, even in the low μ state. Moreover, in the sport mode and the highway mode, the fixed damping force equals a maximum fixed damping force at which vibration such that bouncing motion is produced is not transmitted to the passengers, and therefore degradation of ride comfort can be minimized, and stability of maneuvering improved.

In the first embodiment, the low μ state is excluded as a condition for determining deterioration of estimation accuracy of stroke speed. The reason is that, during steady driving while driving straight ahead at constant speed over a wet road surface or snowy road, the likelihood of vehicle behavior becoming unstable is low, even in the low μ state, and in such cases it is desirable to continue normal control (sprung mass orientation control, driver input control, and unsprung mass vibration damping control), which affords better vibration damping ability than does vehicle speed-sensitive control. In particular, in the first embodiment, because the low μ state is determined from the outside air temperature, supposing a case in which deterioration of estimation accuracy has been determined while in the low μ state, the system will always transition to vehicle speed-sensitive control in cases in which the outside air temperature is outside the prescribed range (outside air temperature ≤5° C. or outside air temperature ≥30° C. or above), even during steady driving. In order to avoid this, it would be necessary to estimate the low μ state with higher precision, leading to increased cost. By excluding the low μ state from the conditions for making a determination of deterioration of estimation accuracy of stroke speed, it is possible for ordinary control to continue during steady driving. Moreover, because determination of the low μ state can be simplified, cost increase can be minimized.

In the control signal conversion unit 35c of the damping force control unit 35, in a case in which a command current value (a deteriorated-estimation accuracy-specific command current value) has been output by the deterioration estimation accuracy detected control unit 5a, the deteriorated-estimation accuracy-specific command current value is output to the S/A 3, in place of a command current value (normal command current value) based on the stroke speed and the damping coefficient reconciled by the damping coefficient reconciling unit 35b. At this time, the command current value is changed gradually, so as to smoothly transition the command current value from the current command current value, to the deteriorated-estimation accuracy-specific command current value, doing so over a prescribed transition time. Here, this transition time is a time equivalent at least to the cycle of the sprung mass resonance (1.2 Hz) or less (for example, 0.5 Hz), for example, a one-second interval. During switching of the command current value for the S/A 3 from a normal command current value based on the stroke speed, to the deteriorated-estimation accuracy-specific command current value based on vehicle speed, in cases in which the command current value for the S/A 3 exceeds the difference of the two command current values, there is a risk of sudden change of the damping force of the S/A, disturbing the vehicle body orientation. By gradually changing the command current value in the aforedescribed manner to limit the extent of fluctuation of the damping force as indicated above, disturbance of the vehicle body orientation at times of deterioration of estimation accuracy can be minimized.

As described above, the first embodiment affords the following effects.

(1) The system is provided with brakes 20 (friction brakes) which perform sprung mass vibration damping control, wheel speed sensors 5 (wheel speed detection means) which detect wheel speed, a second driving state estimating unit 200 (sprung mass state estimating means) which estimates the sprung mass state based on information in a prescribed frequency region about wheel speeds detected by the wheel speed sensors 5, a brake control unit 202 (friction brake orientation control means) which calculates a braking torque control amount for the brakes 20 to bring the sprung mass state estimated by the second driving state estimating unit 200 to a target sprung mass state, and outputs the amount to the brakes 20, an estimation accuracy deterioration detection unit 4a (estimation accuracy deterioration detection means) which detects deterioration of estimation accuracy of the sprung mass state estimated by the second driving state estimating unit 200, and a deterioration estimation accuracy detected control unit 5a (deterioration friction brake orientation accuracy control means) which, in the event that deterioration of estimation accuracy has been detected by the estimation accuracy deterioration detection unit 4a, lowers the braking torque control amount. In so doing, instances of erroneous control arising from limited functionality can be minimized, and stable vehicle orientation achieved.

The brake control unit 202 minimizes pitch motion of the vehicle. Ordinarily, the brakes 20 are capable of controlling both bounce and pitch, and it may therefore be considered preferable for them to perform control of both. However, even in a direction of low control priority in relation to, bounce control by the brakes 20 produces a rather strong sensation of deceleration relative to the difficulty with which controlling effect occurs, and this tended to produce discomfort for the driver. Thus, with regard to the brakes 20, minimizing pitch motion is assigned priority over minimizing bounce motion; and in the first embodiment in particular, a configuration specialized for pitch control is adopted. In so doing, the sensation of deceleration can be minimized, and discomfort to passengers can be reduced.

In the first embodiment, when braking force is applied while the pitch rate Vp is positive, i.e., when the front wheel side of the vehicle is sinking, the front wheel side will sink further, exacerbating the pitching motion; thus, braking force is not applied in such cases. On the other hand, when the pitch rate Vp is negative, i.e., the front wheel side of the vehicle is lifting, the braking pitch moment imparts braking force, which minimizes lift at the front wheel side. This ensures the field of view for the driver, making it easier to see ahead, and contributing to an improved perception of safety and of flatness of ride. Moreover, because braking torque is produced only when the front side of the vehicle rises, the sensation of deceleration produced is less, as compared with the case in which braking torque is produced both during rising and sinking. Additionally, the actuator operation frequency is halved, and therefore low-cost actuators can be employed.

While the first embodiment showed an example of specialization for pitch control, in controlling both pitch motion and bounce motion, it would be acceptable to carry out control in which minimization of pitch motion is performed preferentially, or in which a gain for making the control amount smaller is multiplied by the control amount for bounce motion. The object of the present invention is met also long as pitch control takes place with priority over bounce control. While the first embodiment showed an example of applying skyhook control as the pitch control, other control logic would be acceptable, provided that the configuration is one in which braking torque for minimizing the pitch rate is output.

Further, the deterioration estimation accuracy detected control unit 5a gradually lowers the braking torque control amount prevailing just prior to detection of deterioration of estimation accuracy. When brake pitch control is suddenly halted, the pitch speed, which up to this point was held to a low level, suddenly increases, which can result in discomfort to the driver, as well as posing the risk of magnified pitch behavior and loss of ground contact load of the tires, leading to disturbances in vehicle behavior. By gradually lowering the braking torque control amount, discomfort to the driver can be reduced, and disturbances in vehicle behavior minimized.

(2) The deterioration estimation accuracy detected control unit 5a lowers to zero the braking torque control amount prevailing just prior to detection of deterioration of estimation accuracy, doing so over a prescribed transition time. Instances of continuing erroneous control can be avoided that arising from the braking torque control amount being brought to zero when estimation accuracy deteriorates, and stable vehicle orientation achieved.

(3) The deterioration estimation accuracy detected control unit 5a sets the prescribed transition time to a time equivalent to the frequency of the sprung mass resonance frequency or less (for example, one second). Therefore, destabilization of the vehicle in association with fluctuations during lowering of the braking torque control amount to zero can be avoided, and vehicle stability ensured.

(4) The system is provided with wheel speed sensors 5 (sensors) for detecting wheel speed, and a brake controller 2a (control device) which estimates the pitch rate based on information in a prescribed frequency range detected by the wheel speed sensors 5, and controls the brakes 20 (friction brakes) in such a way as to bring the pitch moment calculated from the pitch rate to a target pitch moment, and which, in the event of deterioration of estimation accuracy of the pitch rate, gradually lowers the control amount of the brakes 20. In so doing, deterioration of estimation accuracy of the pitch rate can be detected. Moreover, instances of erroneous control arising from limited functionality at times of deterioration of estimation accuracy can be minimized, and stable vehicle orientation achieved. Further, by gradually lowering the braking torque control amount prevailing immediately prior to detection of deterioration of estimation accuracy, discomfort to the driver can be reduced.

(5) The system has wheel speed sensors 5 (sensors) for detecting wheel speed, and a brake controller 2a (control device) estimates the pitch rate based on information in a prescribed frequency range detected by the wheel speed sensors 5, and controls the brakes 20 (friction brakes) in such a way as to bring the pitch moment calculated from the pitch rate to a target pitch moment, and which, in the event of deterioration of estimation accuracy of the pitch rate, gradually lowers the control amount of the brakes 20. In so doing, deterioration of estimation accuracy of the pitch rate can be detected. Moreover, instances of erroneous control arising from limited functionality can be minimized, and stable vehicle orientation achieved. Further, by gradually lowering the braking torque control amount, discomfort to the driver can be reduced.

The invention claimed is:

1. A vehicle control device comprising:
a plurality of friction brakes for sprung mass vibration damping control;
at least one wheel speed sensor that detects wheel speed;
a sprung mass state estimating unit that estimates a sprung mass state based on information in a prescribed frequency range of wheel speed detected by the wheel speed sensor;
a friction brake orientation control unit that calculates a braking torque control amount for the friction brakes to bring the sprung mass state estimated by the sprung mass state estimating unit to a target sprung mass state, and the friction brake orientation control unit outputs the braking torque control amount to the friction brakes;
an estimation accuracy deterioration detection unit that detects deterioration of estimation accuracy of a sprung mass state estimated by the sprung mass state estimating unit; and
a deterioration friction brake orientation accuracy control unit that lowers the braking torque control amount, in cases in which deterioration of estimation accuracy has been detected by the estimation accuracy deterioration detection unit;
the friction brake orientation control unit minimizes pitch motion of the vehicle; and
the deterioration friction brake orientation accuracy control unit gradually lowers the braking torque control amount prevailing immediately prior to a time that deterioration of estimation accuracy was detected.

2. The vehicle control device according to claim 1, wherein the deterioration friction brake orientation accuracy control unit, over a prescribed transition time, lowers to zero the braking torque control amount prevailing immediately prior to the time that deterioration of estimation accuracy was detected.

3. The vehicle control device according to claim 2, wherein the deterioration friction brake orientation accuracy control unit sets the prescribed transition time to a time equivalent to the frequency of the sprung mass resonance frequency or less.

4. A vehicle control device comprising:
a sensor configured to detect wheel speed; and
a controller that estimates an amount of pitch motion made by a vehicle based on information in a prescribed frequency range of wheel speed detected by the sensor, and that controls the friction brakes so as to bring the pitch motion amount to a target pitch motion amount, as well as gradually lowers an amount by which the friction brakes are controlled, in instances where an estimation accuracy of the pitch motion amount deteriorates.

5. A control method for controlling a vehicle, the method comprising:
detecting wheel speed using a sensor of the vehicle;
estimating, using a control device, a pitch motion amount based on information in a prescribed frequency range of wheel speed detected by the sensor;
controlling, using the control device, a friction brake so as to bring the pitch motion amount to a target pitch motion amount; and gradually lowering an amount by which the friction brakes are controlled, in instances where an estimation accuracy of the pitch motion amount deteriorates.

* * * * *